United States Patent
Ma

(10) Patent No.: US 11,437,888 B2
(45) Date of Patent: Sep. 6, 2022

(54) MEDIUM CONVEYING AND HEAT EXCHANGE DEVICE AND VORTEX FLOW SEPARATOR FOR IRON CORE IN ELECTROMAGNETIC DEVICE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 464 days.

(21) Appl. No.: 16/493,080

(22) PCT Filed: Mar. 4, 2019

(86) PCT No.: PCT/CN2019/076820
§ 371 (c)(1),
(2) Date: Sep. 11, 2019

(87) PCT Pub. No.: WO2020/042574
PCT Pub. Date: Mar. 5, 2020

(65) Prior Publication Data
US 2021/0367482 A1    Nov. 25, 2021

(30) Foreign Application Priority Data
Aug. 31, 2018  (CN) .......................... 201811011821.X

(51) Int. Cl.
*H02K 9/08*    (2006.01)
*H02K 1/20*    (2006.01)
(Continued)

(52) U.S. Cl.
CPC ................. *H02K 9/08* (2013.01); *F25B 9/04* (2013.01); *F03D 80/60* (2016.05); *H01F 27/085* (2013.01); *H02K 1/20* (2013.01)

(58) Field of Classification Search
CPC .. H02K 1/20; H02K 9/08; H02K 7/18; H02K 7/183; F03D 9/25; F03D 80/60; F25B 9/04; H01F 27/085
(Continued)

(56) References Cited

U.S. PATENT DOCUMENTS

| 4,682,064 | A | * | 7/1987 | Crounse | .................... H02K 9/18 |
| | | | | | 310/59 |
| 4,919,232 | A | * | 4/1990 | Lofton | ............... B23Q 11/1046 |
| | | | | | 184/6.26 |
| 2007/0273219 | A1 | * | 11/2007 | Shimada | ............... F16C 37/005 |
| | | | | | 310/52 |

FOREIGN PATENT DOCUMENTS

| CN | 102874123 A | 1/2012 |
| CN | 202189653 U | 4/2012 |

(Continued)

OTHER PUBLICATIONS

Nellis, G. F. and Klein, S. A., "The Application Of Vortex Tubes to Refrigeration Cycles" (2002). International Refrigeration and Air Conditioning Conference. Paper 537. (Year: 2002).*
(Continued)

*Primary Examiner* — Quyen P Leung
*Assistant Examiner* — Alexander Moraza

(57) ABSTRACT

A medium conveying and heat exchange device and a vortex flow separator for an iron core of an electromagnetic device is provided. The vortex flow separator includes a jet pipe and a vortex flow separation pipe, the vortex flow separation pipe includes a vortex flow chamber, a cold end pipe section and a hot end pipe section. Compressed airflow flows through the jet pipe to form spiral airflow and flow into the
(Continued)

vortex flow chamber in a tangential direction thereof. A valve having a cone-shaped surface is arranged inside the hot end pipe section, central airflow of the spiral airflow passes by the cone-shaped surface of the valve and flows back, and is cooled to become cold airflow, and then flows out from the cold end pipe section, to serve as cooling and drying airflow of the input electromagnetic device.

15 Claims, 10 Drawing Sheets

(51) Int. Cl.
  *F03D 80/60* (2016.01)
  *F25B 9/04* (2006.01)
  *H01F 27/08* (2006.01)
(58) Field of Classification Search
  USPC .................. 290/44, 55; 310/52, 58, 62–64
  See application file for complete search history.

(56) References Cited

FOREIGN PATENT DOCUMENTS

| | | | | |
|---|---|---|---|---|
| CN | 103545948 A | | 1/2014 | |
| CN | 105736258 A | * | 7/2016 | |
| CN | 105736258 A | | 7/2016 | |
| CN | 107612172 A | | 1/2018 | |
| EP | 1533675 A1 | * | 5/2005 | ............ F15B 21/042 |
| JP | 11-237130 A | | 8/1999 | |
| JP | 2008020140 A | | 1/2008 | |
| SU | 956031 A1 | * | 10/1980 | |
| WO | WO-2007025607 A1 | * | 3/2007 | ........... F02B 29/0437 |

OTHER PUBLICATIONS

Vortex Tube—Harvard Natural Sciences Lectures Demonstrations [online], Jul. 2016 [retrieved on Feb. 2, 2022], Retrieved from the Internet:< URL: https://sciencedemonstrations.fas.harvard.edu/presentations/vortex-tube > (Year: 2016).*
CN-105736258-A (English Translation) (Year: 2016).*
EP-1533675-A1 (English Translation) (Year: 2005).*
SU-956031-A1 (English Translation) (Year: 1980).*
WO-2007025607-A1 (English Translation) (Year: 2007).*
The International Search Report dated Apr. 12, 2019; PCT/CN2019/076820.
First European Office Action dated Nov. 25, 2020; Appln. No. 19756313.3.
First Indian Office Action dated Oct. 15, 2020; Appln. No. 201917036030.
Australian Examination Report No. 1 dated Jun. 10, 2020; Appln. No. 2019219831.

* cited by examiner

MEDIUM CONVEYING AND HEAT EXCHANGE DEVICE AND VORTEX FLOW SEPARATOR FOR IRON CORE IN ELECTROMAGNETIC DEVICE

The application is the national phase of International Application No. PCT/CN2019/076820, titled "MEDIUM CONVEYING AND HEAT EXCHANGE DEVICE AND VORTEX FLOW SEPARATOR FOR IRON CORE IN ELECTROMAGNETIC DEVICE", filed on Mar. 4, 2019, which claims the priority to Chinese Patent Application No. 201811011821.X titled "MEDIUM CONVEYING AND HEAT EXCHANGE DEVICE AND VORTEX FLOW SEPARATOR FOR IRON CORE IN ELECTROMAGNETIC DEVICE", filed with the China National Intellectual Property Administration on Aug. 31, 2018, the entire disclosures thereof are incorporated herein by reference.

FIELD

The present application relates to the technical field of cooling of electromagnetic devices, and in particular to a medium conveying and heat exchange device and a vortex flow separator for an iron core in an electromagnetic device.

BACKGROUND

An iron core is an important component of a magnetic circuit, and is used in electrical components such as electric machines and transformers. Taking an electric machine as an example, a stator core, a rotor core, and an air gap between a stator and a rotor constitute the magnetic circuit of the electric machine. In an induction machine, magnetic flux in the stator core is alternating magnetic flux, and thus causing iron core loss, which is called iron loss. The iron loss includes two parts: hysteresis loss and eddy current loss. The hysteresis loss is energy loss caused by a continuous change of orientation of magnetic molecules during alternating magnetization of the iron core. The eddy current loss is resistance loss caused by the eddy current generated during the alternating magnetization of the iron core.

Both the hysteresis loss and eddy current loss are a part of the heat source of the electric machine, and another part of the heat source is generated when current flows through windings of the electric machine. From the perspective of heat transfer theory, the above heat source forms the heat source during operation of the electric machine.

Referring to FIGS. 1 and 2, FIG. 1 is a schematic view of an overall layout of a whole machine in which an inside of a generator is cooled by an air surface type heat exchanger; and FIG. 2 is an exploded schematic view showing the structure of the surface type heat exchanger in FIG. 1.

As shown in FIG. 1, a right side of a generator 500' is connected to a rotor 600', a left side of the generator 500' is provided with a nacelle 100', and a surface type heat exchanger 300' is arranged in the nacelle 100', specifically at a tail portion of the nacelle 300'. A left side of the surface type heat exchanger 300' is provided with an internal circulation induced draft fan 202' driven by an internal circulation driving motor 201'. A drawing and conveying pipe for the internal circulation airflow 400' is further provided. The hot airflow generated by the generator 500' enters, under the action of the internal circulation induced draft fan 202', into the heat exchanger core of the surface type heat exchanger 300' through the drawing and conveying pipe for the internal circulation airflow 400'.

The surface type heat exchanger 300' is further provided with an external circulation induced draft fan 102', the external circulation induced draft fan 102' is driven by an external circulation driving motor 101', and the external circulation induced draft fan 102' introduces the airflow of the natural environment into the heat exchange core of the surface type heat exchanger 300' (two sides of a core sheet are in contact with the flowing internal circulation airflow and the flowing external circulation airflow, respectively), and the external circulation airflow after heat exchange flows out of the nacelle 100', and an external circulation airflow discharge port 103' connected to the outside is shown in FIG. 1. After being cooled, the internal circulation airflow is led out of the surface type heat exchanger 300', and is pressurized by the work of the rotor and then diffused inside the tail portion of the nacelle 100' at 360 degrees.

In FIG. 2, in a case that the internal circulation airflow is introduced, an internal circulation confluence cavity 203' is provided between the surface type heat exchanger 300' and the drawing and conveying pipe for the internal circulation airflow 400', and internal circulation airflow confluence inlets 203a' are provided at both an upper side and a lower side, respectively. An inlet connecting portion 104' of the external circulation induced draft fan is arranged between the external circulation induced draft fan 102' and the surface type heat exchanger 300', and another inlet connecting portion 204' of the internal circulation induced draft fan is provided between the internal circulation induced draft fan 202' and the surface type heat exchanger 300'.

In FIG. 1, a cooling airflow inlet orifice plate 500a' is arranged at a housing of the generator 500', which can be understood with reference to FIG. 3, and FIG. 3 is a schematic view showing the cooling airflow inlet orifice plate 500a' in FIG. 1.

By virtue of the internal space of the nacelle 300', the internal circulation airflow diffused in the nacelle 300' is throttled by an inlet orifice 500b' of the cooling airflow inlet orifice plate 500a' and then enters an interior of the generator 500', to be reused as cooling airflow. The cooling airflow inlet orifice plate 500a' is a throttling member, and local flow resistance caused by a non-circular orifice throttling member is greater.

With continued reference to FIGS. 4 to 6, FIG. 4 is a schematic view showing a state that windings and a ferromagnetic component of the generator are assembled; FIG. 5 is a partial schematic view showing that windings 020 in FIG. 4 are placed in open slots 010b; FIG. 6 is a schematic view showing that radially through cooling ventilation ducts 040 are formed on the iron core of the generator; and FIG. 7 is a schematic view showing a cooling airflow flowing path in a case that the radial cooling ventilation ducts 040 between lamination plates in the stator core of the generator cooperates with the above surface type heat exchanger 300'.

The iron core of the generator includes multiple lamination plates 010 made of a ferromagnetic material, and the lamination plates 010 are superposed in an axial direction to finally form the iron core, and the iron core is fixed to an iron core bracket 030. Each of the lamination plates 010 is provided with multiple radially extending tooth portions 010a along its circumferential direction, and the open slot 010b is formed between each two of the tooth portions 010a. After the lamination plates 010 are superposed in a certain direction, such as in the axial direction, multiple open slots 010b are superposed in the axial direction to form a winding slot 010b' extending axially, and the winding 020 can be accommodated in the winding slot 010b'.

Large-sized and medium-sized hydro-generators mostly employ radial ventilation systems. Specifically, a certain number of cooling ventilation ducts 040 are arranged in the stator core section. Ventilation groove plate which forms the cooling ventilation ducts 040 is formed by a fan-shaped stamping plate (multiple fan-shaped stamping plates may be connected to form the above lamination plate 010 having an annular shape), a ventilation groove steel (not shown in the figures), and a lining ring (not shown in the figures).

Generally, the fan-shaped stamping plate is made of a pickled steel plate having a thickness of 0.35 to 0.5 mm. A surface of the pickled steel plate is required to be flat, smooth, and without oxide skin or other stains. The fan-shaped stamping plate is required to be spot-welded to the ventilation groove steel. An inner end in a radial direction of the fan-shaped stamping plate is provided with a dovetail groove, and the lining ring is located at the dovetail groove of the fan-shaped stamping plate.

As shown in FIG. 6, after the lamination plates 010 are superposed, since the ventilation duct steel props between the lamination plates 010, there will be a through groove extending in the radial direction of the stator core at the position where the ventilation groove steel is welded, that is, the radial cooling ventilation duct 040 configured for cooling is provided at the position of the ventilation groove steel. The above cooled airflow diffused at the tail portion of the nacelle 100' enters the interior of the generator 500' through the cooling airflow inlet orifice plate. As shown in FIG. 7, the cooling airflow entering the interior of the generator 500' may enter an interior of the iron core through the radially through cooling ventilation duct 040, to take away the generated heat, and flows to a confluence passage 070, and then enter a hot air drawing and confluence device 050. Under the action of the internal circulation induced draft fan 202', the airflow flows through the drawing and conveying pipe for the internal circulation airflow 400' to enter gaps formed between fins of the heat exchanger core of the surface type heat exchanger 300' and flows along the gap, the airflow is re-cooled by the external circulation cooling airflow at the other side of the heat exchange fin in the heat exchanger core. The airflow passes through a confluence device 060, is sucked into a rotor of the induced draft fan 202' by the induced draft fan 202', receives the work applied by the rotor and is pressurized, and is discharged into the tail portion of the nacelle 100' in the radial direction of the rotor, and then is diffused. Due to the action of the internal circulation induced draft fan 202', a negative pressure is created at a side, close to the nacelle 300', of the cooling airflow inlet orifice plate 500a' of the generator which is in communication to the nacelle, and a positive pressure is provided at an outlet of the internal circulation induced draft fan 202'. Driven by a pressure difference between the positive pressure and the negative pressure, heat exchange is performed between the airflow in a large space in the nacelle 300' and an inner wall of the nacelle 300' (different situations that heat is released from the airflow to the inner wall of the nacelle 300' or the airflow is heated by the inner wall of the nacelle 300' may occur depending on different seasons), between the airflow and machinery equipment in the nacelle 300', and between the airflow and electrical equipment in the nacelle 300', and finally the airflow is reintroduced into the generator 500' through the cooling airflow inlet orifice plate 500a', and the above process is repeated. That is, a closed air supply passage of the internal circulation airflow is formed inside the nacelle 100', as shown by peripheral arrows in FIG. 7, the annular closed air supply passage is formed.

However, the effect of the above solution is still not ideal for cooling the iron core.

SUMMARY

A vortex flow separator of an electromagnetic device is provided according to the present application, to generate a heat exchange medium in the electromagnetic device; the vortex flow separator includes a jet pipe and a vortex flow separation pipe, the vortex flow separation pipe includes a vortex flow chamber, and a cold end pipe section and a hot end pipe section located at two ends of the vortex flow chamber, respectively; the jet pipe is in communication with the vortex flow chamber, and compressed airflow flows through the jet pipe to form a spiral airflow, and the spiral airflow flows into the vortex flow chamber in a tangential direction of the vortex flow chamber;

a cross-sectional area of the cold end pipe section is smaller than a cross-sectional area of the vortex flow chamber, and a cross-sectional area of the hot end pipe section is equal to or greater than the cross-sectional area of the vortex flow chamber; and a valve having a valve port is arranged inside the hot end pipe section, the valve has a cone-shaped surface facing the cold end pipe section, and after the spiral airflow enters the vortex flow separation pipe, external airflow of the spiral airflow flows toward the valve port, and is gradually heated to become hot airflow, and then flows out through the valve port; central airflow of the spiral airflow passes by the cone-shaped surface of the valve and flows back, and is cooled to become cold airflow, and then flows out from the cold end pipe section, the generated cold airflow and/or hot airflow are heat exchange medium generated in the electromagnetic device.

In this embodiment, a device for generating cooling airflow can be arranged in a narrow space, and it is not necessary to provide a large-volume surface type heat exchanger, the structure and a cooling effect of an iron core in conventional technology can be improved, and thereby energy consumption of an entire wind turbine is reduced.

Optionally, one end of the vortex flow chamber is provided with a through hole, and a pipe body of the cold end pipe section is in communication with the through hole; the vortex flow chamber and the hot end pipe section are integrally formed and have equal diameters.

Optionally, the valve includes a cone-shaped throttling member, a cone-shaped end of the throttling member is arrange to face the cold end pipe section, the throttling member is located at a central portion of the hot end pipe section, and an annular gap formed between the throttling member and an inner wall of the hot end pipe section is embodied as the valve port.

Optionally, an axis of the cold end pipe section coincides with an axis of the throttling member.

Optionally, the valve port is adjustable in size.

Optionally, the valve is arranged at an end of the hot end pipe section.

A medium conveying and heat exchange device for an iron core in an electromagnetic device is further provided according to the present application. The iron core is provided with a cooling passage running through the iron core radially, the medium conveying and heat exchange device includes the vortex flow separator according to any one of solutions, and the cold airflow generated by the vortex flow separator is conveyed into the cooling passage as cooling airflow.

Optionally, the medium conveying and heat exchange device includes an air collection tank in which the compressed airflow is converged, the air collection tank is provided with a plurality of branch pipes, each of the branch pipes is provided with the vortex flow separator for supplying the compressed airflow to the jet pipe of the vortex flow separator.

Optionally, the medium conveying and heat exchange device includes an air compressor, which is configured to supply compressed airflow to the air collection tank, and an air filter is provided upstream of the air compressor.

Optionally, each of the branch pipes is provided with at least two vortex flow separators, and the branch pipe is configured to supply the compressed airflow to jet pipes of the corresponding two vortex flow separators.

Optionally, the branch pipe and the jet pipes in communication with the branch pipe are integrally arranged.

Optionally, the cold end pipe section of the vortex flow separator is inserted into the cooling passage to allow the cold end pipe section to be in communication with the cooling passage; or the medium conveying and heat exchange device includes a connector arranged at an inlet of the cooling passage, and the cold end pipe section of the vortex flow separator is in communication with the connector.

Optionally, the medium conveying and heat exchange device further includes a hot airflow confluence tank, and the hot airflow flowing out of the vortex flow separator is converged in the hot airflow confluence tank.

Optionally, windings are accommodated in slots of the iron core, the medium conveying and heat exchange device further includes an annular spray pipe that is inserted into a penetration hole formed by winding noses of the windings, the annular spray pipe is provided with a plurality of spray holes along its circumferential direction, and the cold airflow or the hot airflow is introduced into the annular spray pipe.

Optionally, the cold airflow or the hot airflow output by the vortex flow separator is allowed to be conveyed to the annular spray pipe.

Optionally, the spray holes are arranged at an inner side of the annular spray pipe, or at an inner side and a middle portion of the annular spray pipe, and an outer side of the annular spray pipe is not provided with the spray holes.

Optionally, at least one airflow dividing pipe is arranged inside the annular spray pipe, the cold airflow or the hot airflow first enters the airflow dividing pipe, and the airflow dividing pipe sprays the cold airflow or the hot airflow from two ends of the airflow dividing pipe to guide the hot airflow or the cold airflow to flow in the circumferential direction of the annular spray pipe.

Optionally, the hot airflow formed by the cold airflow through heat exchange in the cooling passage of the iron core, and/or the hot airflow separated from the vortex flow separator, is allowed to be conveyed to at least one of the following components of a wind turbine:
a hub;
a front edge inside a blade;
a pitch bearing
a wind gauge support on an upper portion of a nacelle; and
a yaw bearing.

The medium conveying and heat exchange device of the iron core of the electromagnetic device includes the above vortex flow separator, and thus has the same technical effects as that of the vortex flow separator.

Figure 1:
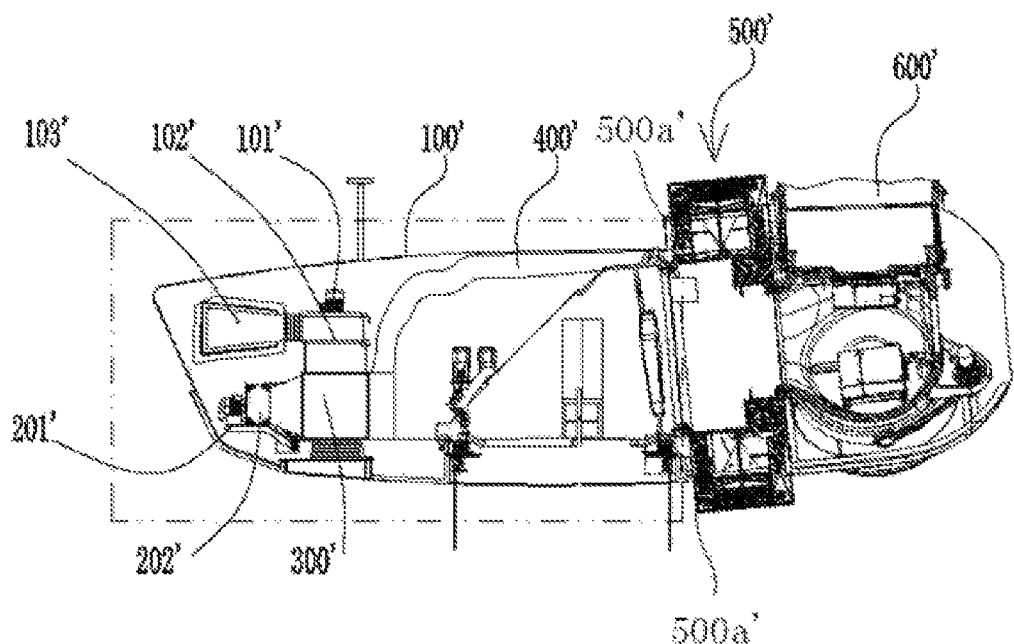
FIG. 1 is a schematic view of an overall layout of a whole machine in which an inside of a generator is cooled by an air surface type heat exchanger.
Figure 2:
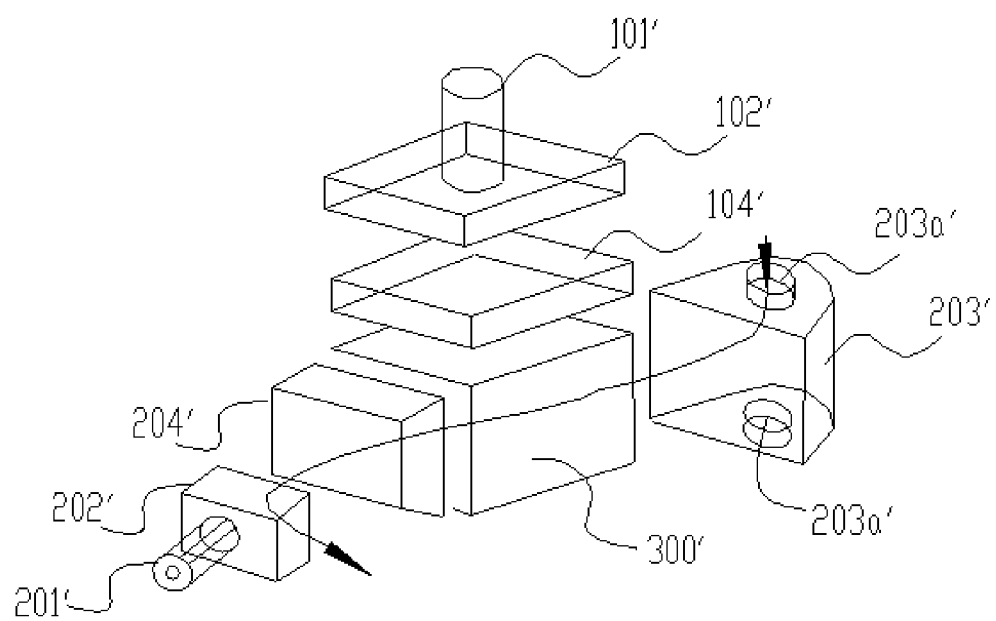
FIG. 2 is an exploded schematic view showing the structure of the surface type heat exchanger in FIG. 1.
Figure 3:
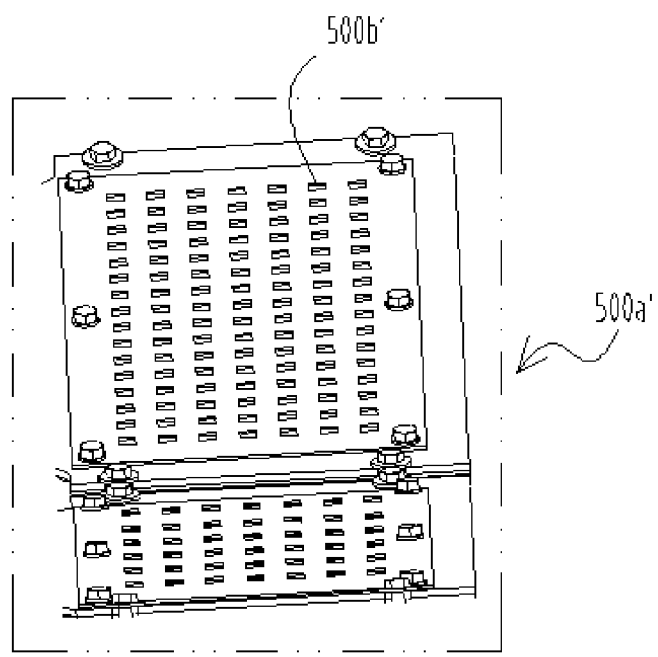
FIG. 3 is a schematic view showing a cooling airflow inlet orifice plate in FIG. 1.
Figure 4:
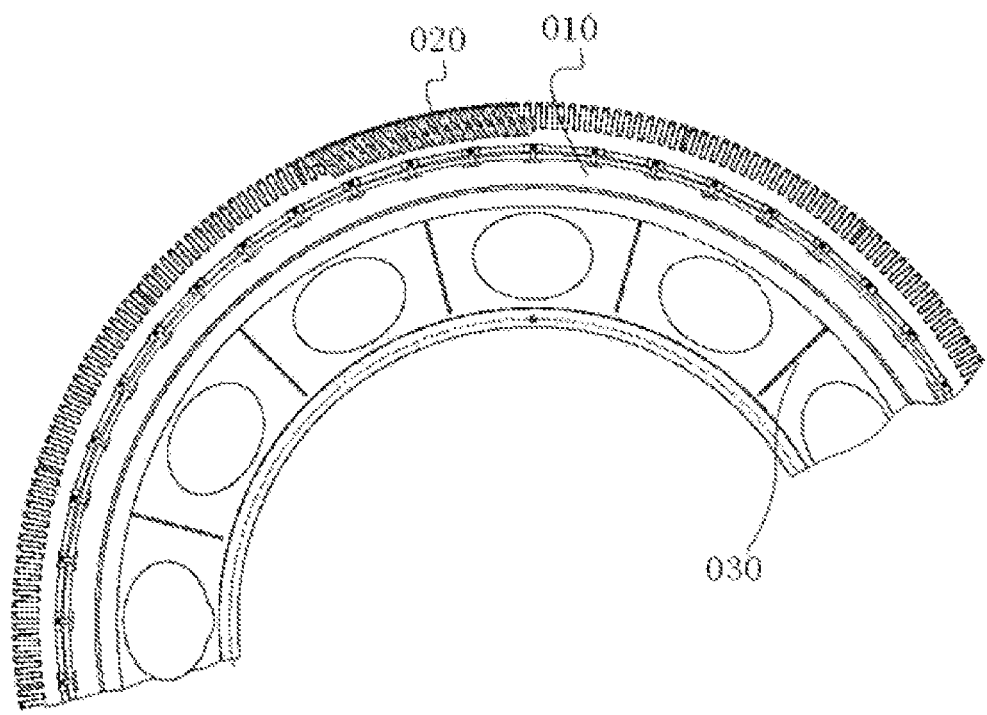
FIG. 4 is a schematic view showing a state that windings and a ferromagnetic component of a generator are assembled.
Figure 5:
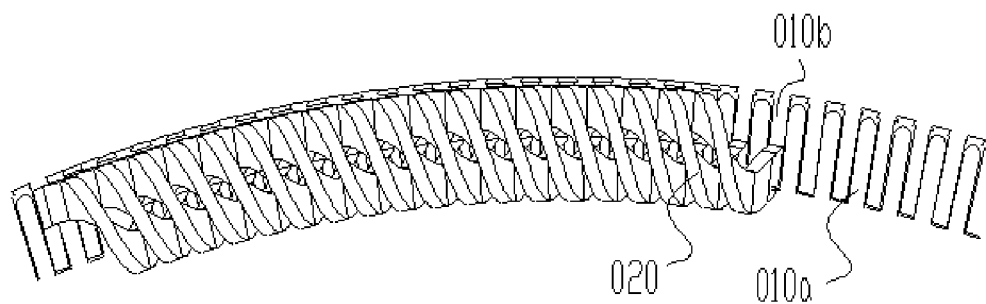
FIG. 5 is a partial schematic view showing that windings in FIG. 4 are placed in open slots.
Figure 6:
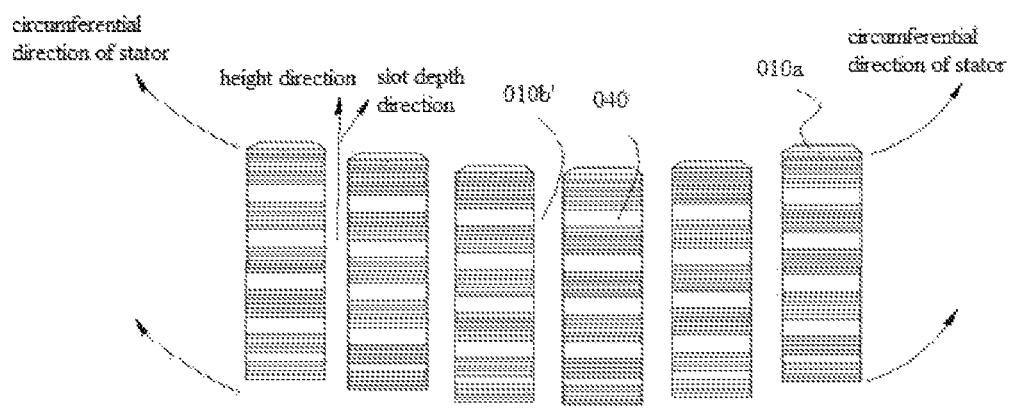
FIG. 6 is a schematic view showing that radially through cooling ventilation ducts are formed on an iron core of the generator.
Figure 7:
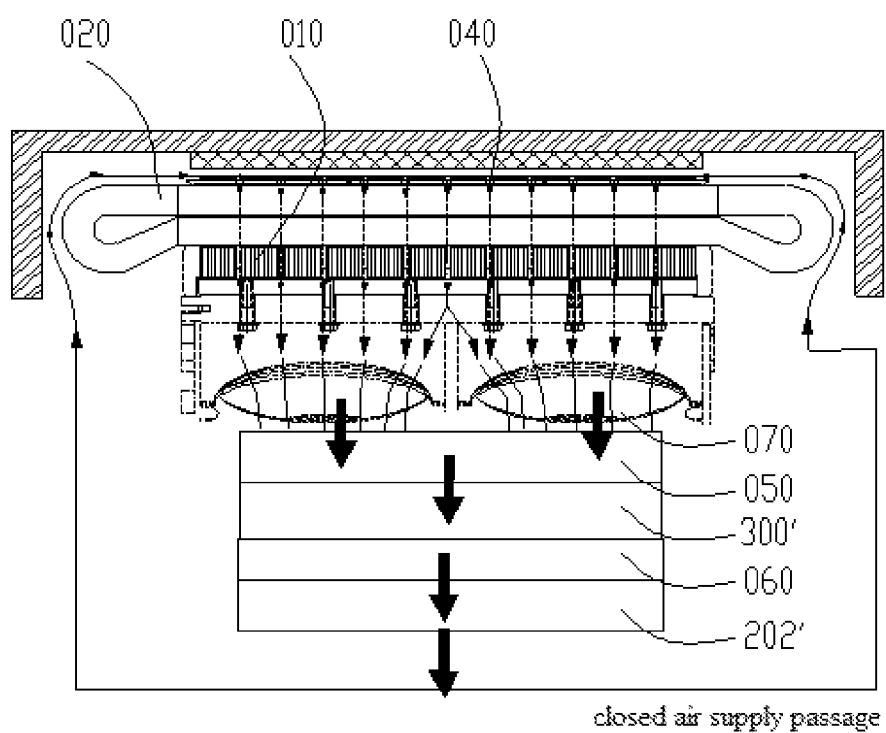
FIG. 7 is a schematic view showing a cooling airflow flowing path in a case that the radial cooling ventilation ducts of the generator cooperates with the above surface type heat exchanger.

| Reference Numerals in FIGS. 1 to 7: | | | |
|---|---|---|---|
| 100' | nacelle, | 101' | external circulation driving motor, |
| 102' | external circulation induced draft fan, | 103' | external circulation air discharge port, |
| 104' | inlet connecting portion of the external circulation induced draft fan, | | |
| 201' | internal circulation driving motor, | 202' | internal circulation induced draft fan, |
| 203' | internal circulation confluence cavity, | | |
| 204' | inlet connecting portion of the external circulation induced draft fan; | | |
| 300' | surface type heat exchanger; | | |
| 400' | drawing and conveying pipe for the internal circulation airflow; | | |
| 500' | generator, | 500a' | cooling airflow inlet orifice plate, |
| 500b' | inlet hole; | | |
| 600' | rotor; | | |
| 010 | lamination plate, | 010a | tooth portion, |
| 010b | open slot, | 010b' | winding slot; |
| 030 | structural bracket, | 040 | cooling ventilation duct, |
| 050 | hot air drawing and confluence device, | 060 | confluence device, |
| 070 | confluence passage; | | |
| Reference Numerals in FIGS. 8 to 18: | | | |
| 100 | nacelle, | 200 | generator, |
| 201 | magnetic yoke, | 202 | magnetic pole, |
| 203 | winding, | 203a | winding nose, |
| 204 | iron core, | 205 | cooling passage, |
| 206 | slot wedge, | 300 | surface type heat exchanger, |
| 500 | induced draft fan, | 600 | driving motor, |
| 700 | variable cross-section conveying pipe, | 701 | inlet end, |
| 702 | outlet end; | | |
| 10 | vortex flow separator, | 101 | vortex flow separation pipe, |
| 101a | vortex flow chamber, | 101a1 | end plate, |
| 101b | hot end pipe section, | 101c | cold end pipe section, |
| 101d | cold end, | 101e | hot end, |
| 102 | jet pipe, | 103 | throttling member; |
| 20 | annular spray pipe, | 20a | airflow dividing pipe; |
| 30 | connecting pipe, | 40 | air collection tank, |
| 401 | branch pipe, | 50 | hot airflow confluence tank; |
| 60 | air filter, | 70 | air compressor, |
| a | annular air gap. | | |

DETAILED DESCRIPTION

For those skilled in the art to better understand technical solutions of the present application, the present application will be further described in detail hereinafter in conjunction with drawings and specific embodiments.

Figure 8:
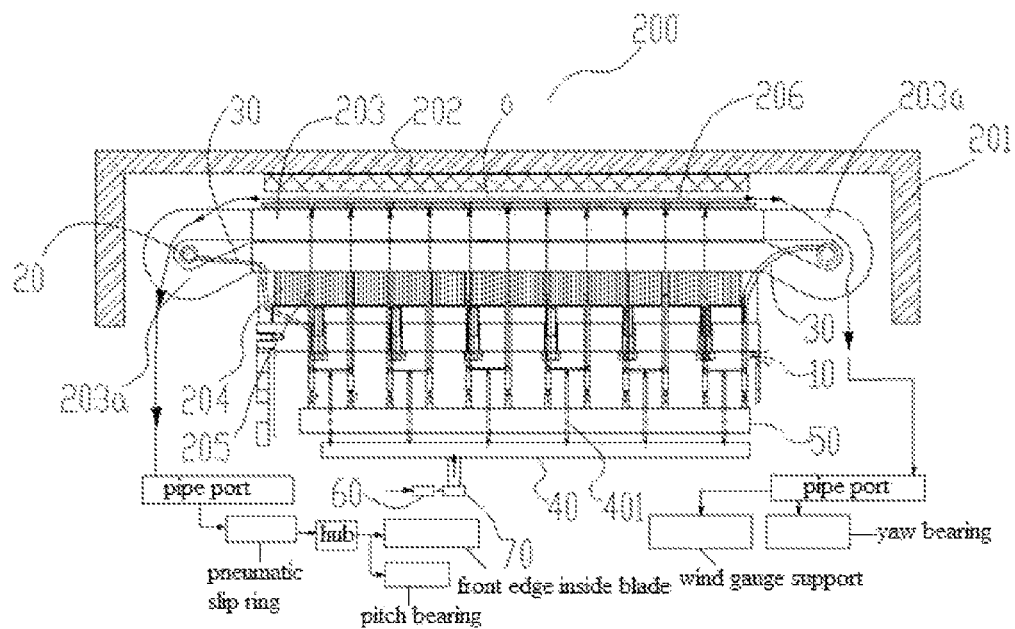
FIG. 8 is a schematic view showing the structure of the generator and the structure of a cooling and drying medium generating, conveying and heat exchange device of the generator according to the present application.
Figure 9:
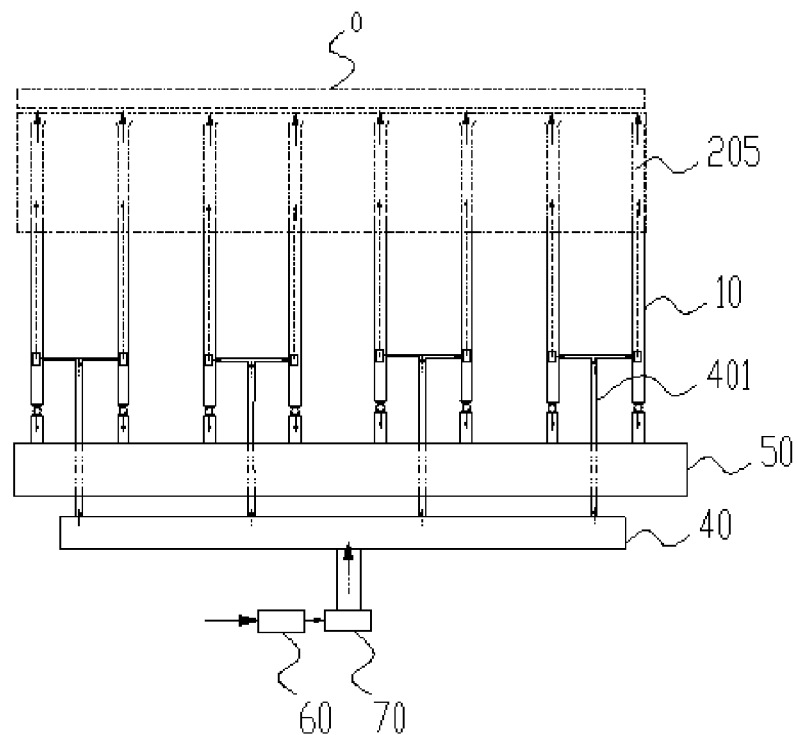
FIG. 9 is a schematic view showing a generator portion of the cooling and drying medium generating, conveying and heat exchange device carried by an iron core itself in FIG. 8.

Referring to FIG. 8, FIG. 8 is a schematic view showing the structure of a generator 200 and the structure of a cooling and drying medium generating, conveying and heat exchange device of the generator 200 according to the present application; and FIG. 9 is a schematic view showing a generator portion of the cooling and drying medium generating, conveying and heat exchange device for an iron core carried by the iron core itself in FIG. 8.

In this embodiment, taking a wind turbine as an example for an electromagnetic device, the generator 200 includes a magnetic yoke 201 located at an outer side, a magnetic pole 202 located at a wall surface at a radial inner side of the magnetic yoke 201, and an iron core 204 located at a radial inner side of the magnetic pole 202 in a radial direction. The iron core 204 is an important component of a magnetic circuit of the generator. A stator core, a rotor magnetic yoke, a rotor magnetic pole and an air gap between a stator and a rotor constitute the magnetic circuit of the generator. Magnetic flux in the stator core of an alternating-current generator is alternating, thus causing iron core loss, which is called iron loss. The iron loss includes two parts: hysteresis loss and eddy current loss. The hysteresis loss is energy loss caused by a continuous change of orientation of the magnetic molecules during alternating magnetization of the iron core. The eddy current loss is resistance loss caused by the eddy current generated during alternating magnetization of the iron core 204. Both the hysteresis loss and eddy current loss are a part of a heat source, and another part of the heat source is generated when current flows through windings of the generator. From the perspective of heat transfer theory, above heat source forms the heat source during operation of the generator.

When the generator is in operation, the iron core 204 is cooled to indirectly cool stator windings, to suppress and control a temperature rise of an insulating material of the stator windings and to keep dry at the same time. A permanent magnet wind power generator employs an open air gap cooling structure, and internal components of the generator is heavily affected with damp during use, which causes an insulation level of the stator of the generator to decrease and leads to a hidden danger that a protective coating on a surface of a permanent magnetic pole of the rotor may be peeled off from the surface of the permanent magnetic pole after being expanded due to moist and heat, and even a hidden danger that the magnetic pole may be rusted. The above phenomena may cause deterioration of insulation performance, resulting in deterioration of electrical performance and mechanical performance of the generator, and reduction of residual withstand voltage level and service life, and thereby leading to damage of insulation finally.

In this embodiment, the iron core 204 is provided with a cooling passage 205 running through the iron core 204 radially. Cooling airflow is conveyed to the cooling passage 205 to pass through the cooling passage 205, thereby completing heat exchange and cooling of the iron core 204.

As shown in FIG. 8, in this embodiment, a medium conveying and heat exchange device is provided for conveying the cooling airflow to the cooling passage 205 of the iron core 204. The medium conveying and heat exchange device is as shown in FIG. 9. As shown in FIG. 9, the medium conveying and heat exchange device includes multiple sets of vortex flow separators 10 that can separate airflow into hot airflow and cold airflow, and the cold airflow can be conveyed to the cooling passage 205 to serve as the cooling airflow.

Figure 10:
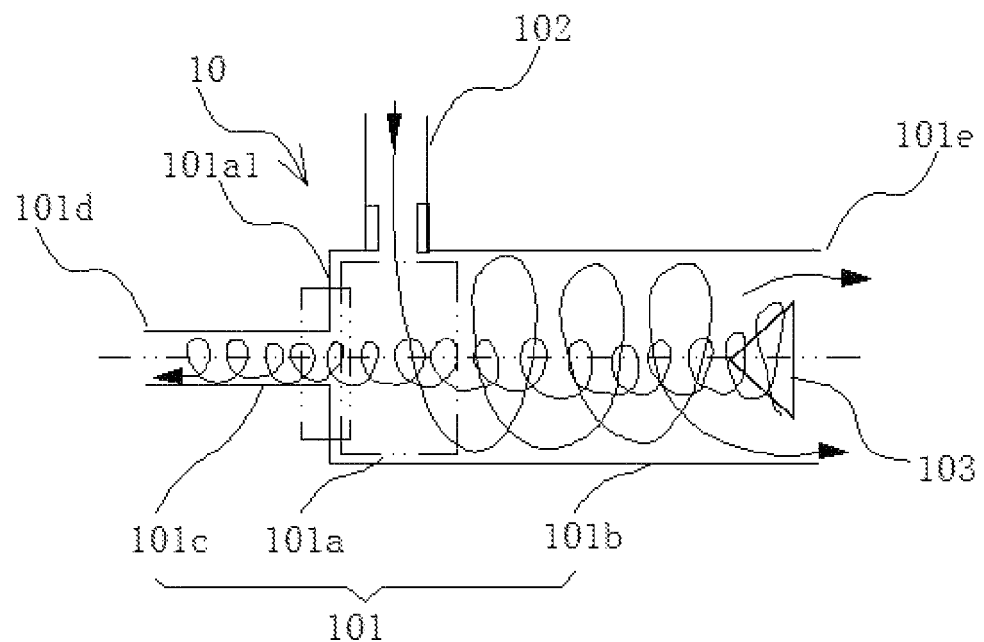
FIG. 10 is a schematic view showing the basic structure of the vortex flow separator in FIG. 9 and operation principle of total temperature separation of the airflow.
Figure 11:
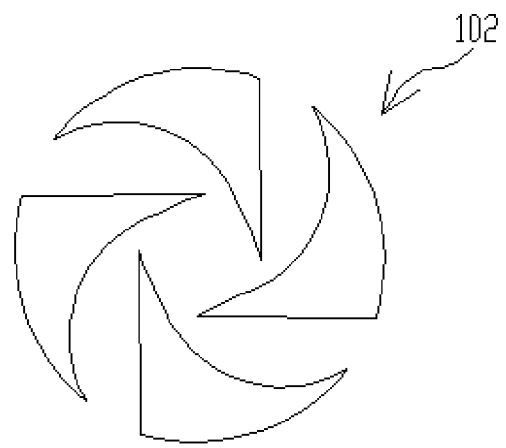
FIG. 11 is a schematic view showing a flow section of a flow passage of a jet pipe in the above figure.

As shown in FIGS. 10 and 11, FIG. 10 is a schematic view showing the basic structure of the vortex flow separator in FIG. 9 and operation principle of the total temperature separation of the airflow; and FIG. 11 is schematic view showing a flow section of a flow passage of the jet pipe in FIG. 10.

In FIG. 10, the vortex flow separator 10 serving as a cold source of the iron core 204 itself includes a jet pipe 102 and a vortex flow separation pipe 101. The jet pipe 102 is connected to a side wall of the vortex flow separation pipe 101 to be in communication with the vortex flow separation pipe 101, and a portion of an inner chamber of the vortex flow separation pipe 101 facing the jet pipe 102 forms a vortex flow chamber 101a. A cold end pipe section 101c is located at one end of the vortex flow chamber 101a (a left end in FIG. 10), and a hot end pipe section 101b is located at another end of the vortex flow chamber 101a (a right end in FIG. 10). An outlet of the cold end pipe section 101c is a cold end 101d for outputting the cold airflow, and an outlet of the hot end pipe section 101b is a hot end 101e for outputting the hot airflow. An end plate 101a1 located at the left end of the vortex flow chamber 101a is provided with a through hole, the end plate 101a1 is defined as a cold end orifice plate herein, and the cold end pipe section 101c is in communication with the through hole. As shown in FIG. 10, the cold end pipe section 101c is a relatively thin pipe section having a cross-sectional area smaller than that of the vortex flow chamber 101a. The vortex flow chamber 101a and the hot end pipe section 101b have equal diameters, the vortex flow chamber 101a and the hot end pipe section 101b can be integrally or separately arranged, and the integral arrangement is simpler.

The jet pipe 102 of the vortex flow separator 10, which serves as the cold source carried by the iron core 204 itself in the electromagnetic device, is an energy conversion component that converts pressure energy of compressed air into kinetic energy carried by high-speed airflow. The jet pipe 102 may include an inlet section, a body section, and an outlet section, and the outlet section is provided with a nozzle for jetting airflows. Spiral airflow is formed after the airflow passes through the jet pipe 102, as shown in FIG. 11, a swirl plate is arranged inside the jet pipe 102, that is, the outlet section of the jet pipe 102 is a volute, and after entering the jet pipe 102, the airflow forms the spiral airflow to be outputted. The jet pipe 102 is required to be in communication with the vortex flow chamber 101a tangentially, that is, the spiral airflow jetted from the jet pipe flows swirlingly into the vortex flow separation pipe 101 in a tangential direction of the vortex flow separation pipe 101. The airflow can be uniformly distributed to the nozzle at the output section of the jet pipe 102 by the volute, the energy loss is minimized, and it is ensured that the airflow flows axisymmetrically at an inner circumference of the volute.

Since the cross-sectional area of the cold end pipe section 101c is relatively small, as for the spiral airflow entering the vortex flow chamber 101a, resistance at the cold end 101d orifice plate is relatively large, and the airflow tangentially swirled into the vortex flow separation pipe 101 flows toward the hot end pipe section 101b in an opposite direction of the cold end 101d. Here, a cross-sectional area of the hot end pipe section 101b may be equal to or greater than a cross-sectional area of the vortex flow chamber 101a, to ensure that the spiral airflow will flow toward the hot end pipe section 101b.

A valve having a cone-shaped surface is further provided in the hot end pipe section 101b, the valve is specifically embodied as a cone-shaped throttling member 103 as shown in FIG. 10, and a cone-shaped end of the throttling member 103 faces a direction opposite to a flowing direction of the spiral airflow. As shown in FIG. 10, after the spiral airflow enters the vortex flow separation pipe 101 from the jet pipe 102, the airflow flows spirally from left to right. When the spiral airflow reaches the throttling member 103, external airflow of the spiral airflow can flow out from the valve, that is, the external airflow of the spiral airflow flows out through an annular gap between the throttling member 103 and the vortex flow separation pipe 101 and is heated up to become hot airflow, as shown in FIG. 10, the hot airflow flows out from the hot end 101e of the hot end pipe section 101b.

Central airflow of the spiral airflow will collide with the throttling member 103. After colliding with the cone-shaped surface of the throttling member 103, the airflow is guided by the cone-shaped surface of the throttling member 103, to flow swirlingly in an opposite direction to form reflux airflow. During the above flowing process, the airflow will be cooled down gradually, and a temperature of the cooling airflow can be greatly reduced to −50 to 10 degrees Celsius. The external airflow and the central airflow herein are defined with respect to a center line of the spiral airflow, the spiral airflow close to the center line is the central airflow, and the airflow away from the center line and close to a radially outermost side of the spiral airflow is the external airflow. In order to ensure that the spiral airflow flows to the hot end pipe section 101b and then flows reversely, to form the hot airflow and the cold airflow, the throttling member 103 may be arranged at a tail end of the hot end pipe section 101b.

In the above technical solution, since it is required that the spiral flow can flow reversely after passing through the valve, the cone-shaped throttling member 103 is provided. For forming the reflux spiral airflow, the valve is only required to have a certain range of a cone-shaped surface, for example, the valve is like a truncated cone (that is, a section of a cone without a cone tip), or a half cone formed by cutting a cone in an axial direction. However, it can be understood that, in order to better form a choking effect and to better guide the reflux spiral airflow, it is preferred that the valve is provided to be a complete cone as shown in FIG. 10. In addition, an axis of the cone-shaped throttling member 103 coincides with an axis of the cold end pipe section 101c, which facilitates the swirling flow of the airflow when the reflux spiral airflow flows swirlingly toward the cold end pipe section 101c, and thereby reducing the energy loss.

It can be seen that, the vortex flow separator 10 of the iron core 204 of the electromagnetic device which carries the cold source itself can generate a temperature separation effect that performs temperature separation to a stream of airflow, to obtain two streams of airflow, that is, cold airflow and hot airflow, and an extremely large temperature difference exists between the two streams of airflow The vortex flow separator 10 is researched based on a phenomenon of a tornado.

A tornado is a strong cyclone phenomenon in nature that occurs under certain atmospheric conditions. Oceanic vortices that travel vertically from a water surface to a seabed may also be generated in the ocean under certain atmospheric conditions. A typical tornado airflow structure shows that a tornado center is a funnel-like or trumpet-like pointed cone. This cone is a convolution zone of the tornado, a swirling direction of the cone is the same as that of rising hot airflow at a periphery filled with dust, but an axial flow direction of the airflow in the central cone is opposite to that of the rising airflow at the periphery, and the airflow in the central cone flows downward. Cold airflow in the central cone of a tornado is traced and measured in the natural environment, and a falling flow rate of the cold airflow can reach 17 m/s. Once a cone tip of the center cone diverges, the tornado is rapidly strengthened and the cone tip disappears and becomes a truncated cone. The hot airflow at the periphery swirls while rises, and when reaching a bottom surface of a cold cloud layer at an upper layer or the stratosphere, the airflow will immediately diverge swirlingly in a flare shape in a horizontal direction and change the swirling direction to be reversely thrown swirlingly. The air swirls rapidly around an axis of the tornado, being drawn due to extreme reduction of an air pressure at a center of the tornado, the airflow is drawn into a bottom of a vortex flow from all directions in a thin layer of air which is tens of meters thick close to the ground, and then becomes the vortex flow that swirls upward around the axis at a high speed. Therefore, the air in the tornado is always cyclonic, and a central air pressure is 10% lower than that of a surrounding air pressure, and the central air pressure is generally as low as 400 hPa, and a minimum value is 200 hPa. The tornado has a great sucking effect, which can suck sea water or lake water away from a sea surface or a lake surface, to form a water column to be connected with the cloud, commonly known as "dragon sucking water".

The energy source of the tornado: one energy source is heat energy of the airflow at the periphery of the tornado, and another energy source is vacuum energy in a low pressure zone at a center of the vortex flow. High temperature air of the airflow at the periphery of the tornado interacts with the tornado, causing the thermal energy to be converted into rotational kinetic energy. The mechanism is explained by the Crocco theorem. The Crocco theorem is obtained in a fluid vortex flow field based on the first law of thermodynamics, that is, conservation of energy. The theorem quantitatively expresses a relationship among a gradient of thermodynamic enthalpy, a gradient of entropy and swirling intensity of the vortex flow in the vortex flow field. Temperature differences in the atmosphere and up and down convection are prerequisites for the formation of the tornado vortex flow, and the energy that enhances the tornado vortex flow comes from the surrounding heat energy. The gradient of the thermodynamic enthalpy formed between the rising hot airflow at the periphery of the tornado and the falling cold airflow at the center of the vortex flow becomes a key factor in the conversion of atmospheric heat energy into flowing kinetic energy of the vortex flow. After intensity of the tornado reaches a certain degree with the help of the heat energy, further intensification depends on the vacuum energy in the low pressure zone at the center of the vortex flow. A lower cone of the tornado center is in the same swirling direction as the peripheral airflow. The airflow in the lower cone swirls while falling andconverges toward the center at the same time. After a centripetal accelerated speed exceeds a certain critical value, the swirling of the radial peripheral airflow is accelerated by viscous diffusion during the radial confluence process under an effect of Coriolis force.

That is, the tornado has a total temperature separation phenomenon. The vortex flow separator 10 according to this embodiment is like a tornado, and the jet pipe 102 is provided to make the compressed airflow form spiral airflow, which can be regarded as a spiral flow of a small-scale tornado. In this way, the total temperature separation of the tornado is simulated in the vortex flow separation pipe 101, and thereby forming the desired hot and cold airflow.

The mechanism of this technical solution is sought hereinabove from the nature world, and the principle of the temperature separation effect of the vortex flow separator 10 will be described hereinafter.

Figure 12:
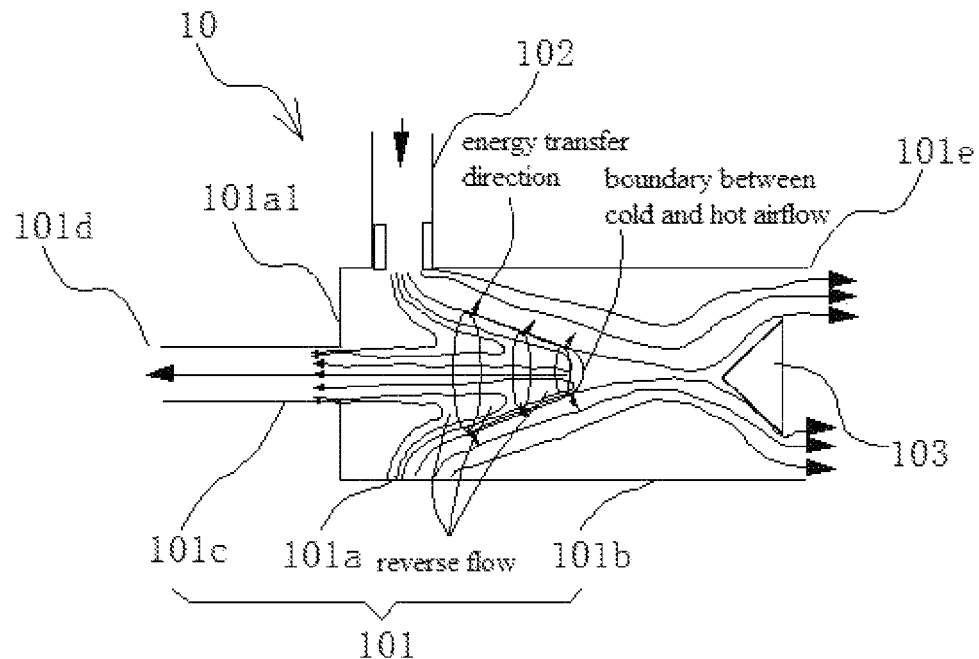
FIG. 12 is a schematic view showing an internal flow field and heat energy transfer in the vortex flow separator of the iron core in FIG. 10.
Figure 13:
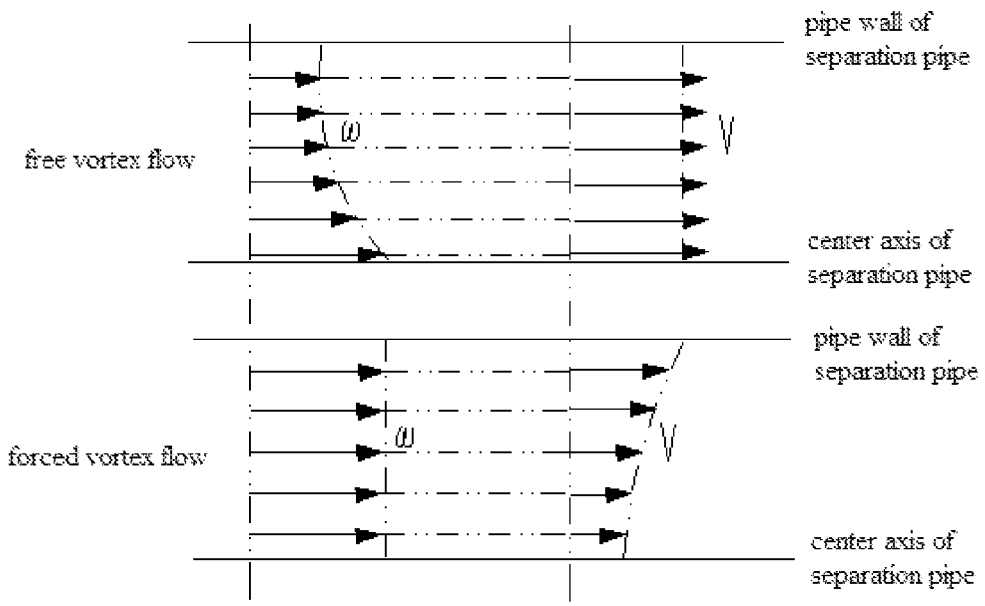
FIG. 13 is a schematic view showing the comparison between a free vortex flow and a forced vortex flow.

Referring to FIGS. 12 and 13, FIG. 12 is a schematic view showing an internal flow field and heat energy transfer in the vortex flow separator 10 of the iron core 204 in FIG. 10; and FIG. 13 is a schematic view showing the comparison between a free vortex flow and a forced vortex flow.

According to the law of conservation of energy, a sum of the energy of the cold airflow and the hot airflow flowing out of the vortex flow separation pipe 101 should be equal to the energy of the compressed air entering the jet pipe 102 of the vortex flow separator 10 (the premise is that the vortex flow separator 10 is in a good heat insulation condition). Therefore, there is necessarily a process of energy redistribution in the vortex flow separator 10 to transfer a portion of the energy from the cooling airflow to the hot airflow.

First, a compressed gas is supplied to the jet pipe 102, which is hereinafter referred to as a high-pressure gas. As shown in FIG. 9, an air compressor 70 may be provided, and the compressed gas is supplied by the air compressor 70. To prevent the provided cooling airflow from affecting an internal environment of the iron core 204, an air filter 60 may be provided at an inlet of the air compressor 70.

Airflow of the compressed gas expands and accelerates in the jet pipe 102 of the vortex flow separator 10, and an airflow speed may approach the sound speed when the airflow is entering the vortex flow chamber 101a of the vortex flow separation pipe 101, and in a case that a convergent-divergent jet pipe 102 is employed, the above airflow speed will exceed the sound speed. Since the airflow rapidly expands and passes through the jet pipe 102, which can be approximatively regarded as an adiabatic process. The airflow speed is very high at the nozzle located at the outlet of the jet pipe 102, and a corresponding thermodynamic temperature of the airflow at the nozzle is much lower than a temperature of the airflow at the inlet of the jet pipe 102, that is, a primary controllable temperature drop is performed.

After the airflow enters the vortex flow chamber 101a of the vortex flow separation pipe 101 in the tangential direction, the airflow continues to move spirally along an inner wall of the vortex flow chamber 101a to form high-speed swirling airflow. When the airflow just flows out of the jet pipe 102, V=const or ω*r=const, where V is a tangential speed of the airflow and ω is an angular speed. This type of swirling is also called the free vortex flow. As shown in FIG. 13, FIG. 13 shows differences of the tangential speed and the angular speed between the free vortex flow and the forced vortex flow. At this time, a moving track of the airflow in the vortex flow chamber may be seen as the Archimedes spiral. The formation of the cooling airflow and the hot airflow is analyzed hereinafter.

The formation of the hot airflow is as follows. Since the flowing of the airflow just coming out of the jet pipe 102 is the free vortex flow, the angular speed has a gradient in the radial direction, causing friction between radial layers of the airflow, such that an angular speed of the external airflow of the spiral airflow is gradually increased, and an angular speed of the central airflow of the spiral airflow is gradually reduced. However, because of the fast flow and short flowing path, the spiral airflow has not reached the full forced vortex flow, but progresses to a central portion thereof. The external airflow of the spiral airflow moves spirally in the hot end pipe section 101b, which includes both swirling movement and axial movement. During the movement, the external airflow rubs against an inner wall of the hot end pipe section 101b, thus the speed of the external airflow becomes lower and lower, the temperature of the external airflow gradually rises, and the external airflow eventually flows out through the annular gap between the throttling member 103 and the hot end pipe section 101b. By adjusting the gap between the throttling member 103 and the hot end pipe section 101b, a ratio of the cold airflow to the hot airflow can be adjusted.

The formation of the cold airflow is as follows. The airflow is embodied as the free vortex flow when the airflow just flows out of the jet pipe 102. Under an action of a centrifugal force, and being blocked by the cold end 101d orifice plate of the cold end pipe section 101c, the airflow will flow, near the inner wall of the hot end pipe section 101b, toward the throttling member 103. During the flowing process, due to gradual dissipation of an axial speed, when the spiral airflow moves to a certain position in the axial direction, the axial speed of the spiral airflow is already close to zero, the above position may be defined as a stagnation point. At this time, because the central airflow converges at the stagnation point, a pressure is continuously increased, and the pressure at the stagnation point is higher than a cold end 101d pressure at the outlet of the cold end pipe section 101c, thus reverse axial movement occurs in a central region of the hot end pipe section 101b, that is, reflux airflow starts from the stagnation point, and is gradually cooled down to form the cold airflow, that is, a secondary temperature drop is performed. At the stagnation point, a total temperature of the external airflow is higher than that of the central airflow. During the movement of the reverse flow to the cold end pipe section 101c, a portion of the spiral flow at an outer layer is continuously diverted to join the reverse flow, thus the reverse flow gradually expands, and a flow rate of the reverse flow reaches a maximum when the reverse flow reaches the cold end 101d orifice plate.

As shown in FIG. 12, in one cross section of the flow passage of the vortex flow separation pipe 101, a static pressure of an outermost airflow of the external airflow is maximum, and a static pressure of an innermost airflow at a central axis of the central airflow is minimum. At a cross section near the nozzle of the jet pipe 102, a ratio of a maximum static pressure to a minimum static pressure is the largest, the ratio may range from 1.5 to 2, and a static temperature is highest at a wall surface of the vortex flow separation pipe 101 and lowest at the central axis.

In any cross section of the flow passage, a tangential speed of the airflow at any point is dominant. Near the nozzle of the jet pipe 102, both a radial speed and an axial speed of the airflow reach a maximum and then gradually decrease in respective directions.

As described above, after leaving the nozzle, the airflow enters the vortex flow separation pipe 101 in a tangential direction, and the airflow is divided into two regions. The external airflow tangentially swirls toward a hot end 101e outlet of the hot end pipe section 101b along the inner wall of the vortex flow separation pipe 101, that is, the external airflow in an outer layer region forms the free vortex flow. The central airflow flows back from the position where the throttling member 103 is arranged, due to driving of the surrounding free vortex flow, and then with the friction, an inner layer region (the central airflow) in which the airflow swirls like a rigid body is converted into or to be close to the forced vortex flow.

A boundary between external and central regions, that is, the external airflow and the reflux central airflow, depend on a magnitude of a cold airflow rate. The boundary between the cold and hot airflow can be seen in FIG. 12. Over a length of the entire vortex flow separation pipe 101, an interface of the boundary is generally located within a range of 0.65R to 0.75R from the central axis, which is a flowing range of the central airflow in the radial direction, where R is a radius of the vortex flow separation pipe 101. From the nozzle of the jet pipe 102 to the throttling member 103, the external airflow flows in the axial direction within a range that a radius ranges from 0.65R to 1R, which is a flowing range of the external airflow in the radial direction. In the inner region, the central airflow flows reversely, and the flowing starts just from the throttling member 103.

A central airflow temperature of the central airflow is highest at the throttling member 103, the reverse flow is gradually cooled down, and the central airflow temperature is lowest when airflow reaches the cold end 101d orifice plate. A maximum temperature difference occurs in a direction of the central axis, a highest temperature is at a position of the central axis corresponding to the throttling member 103, and a lowest temperature is at a position of the central axis corresponding to the cold end 101d orifice plate. As for the central airflow at the inner layer, that is, the cold airflow, a static temperature is lowest at the central axis and reaches the maximum at the interface of the boundary between the inner layer airflow and the outer layer airflow.

In any cross section of the flow passage of the vortex flow separation pipe 101, the total temperature is highest at a position near the inner wall surface of the vortex flow separation pipe 101 and lowest at the central axis. At the cross section of the flow passage at a position of the nozzle, a temperature difference between a wall temperature of the vortex flow separation pipe 101 and a temperature at the central axis reaches a maximum value.

Figure 14:
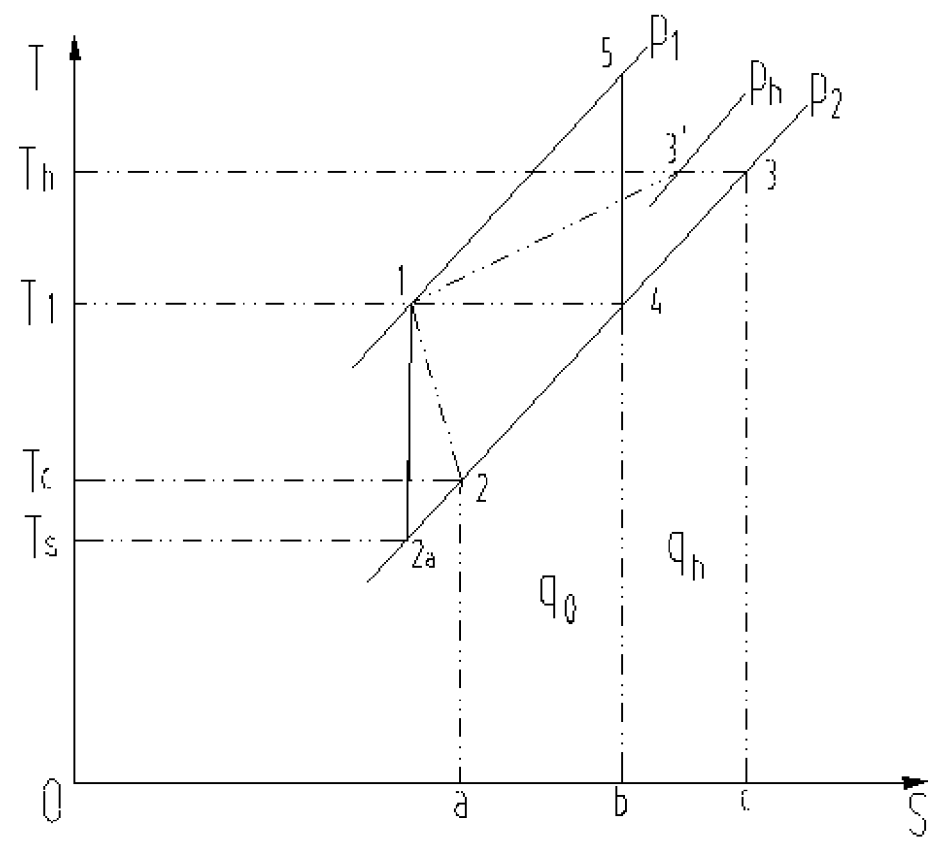
FIG. 14 is a schematic view showing an operation process of the total temperature separation inside the vortex flow separator in FIG. 10 based on a thermodynamic temperature-entropy (T-S) diagram.

The total temperature separation effect of the vortex flow separator 10 may be referred to FIG. 14, which is a schematic view showing an operation process of the total temperature separation inside the vortex flow separator in FIG. 10 based on a thermodynamic temperature-entropy (T-S) diagram. As can be seen from FIG. 14, the vortex flow separator 10 does separate the compressed airflow entering the jet pipe 102.

In FIG. 14, point 4 shows a state before the gas is compressed, that is, a state before the gas entering the air compressor 70. A process from point 4 to point 5 is an isentropic compression process of the airflow. A process from point 5 to point 1 is an isobaric cooling process of the compressed gas. Point 1 indicates a state before the compressed gas enters the jet pipe 102 of the vortex flow separator 10, the compressed gas adiabatically expands under an ideal condition to a pressure $P_2$, and the temperature is lowered to $T_s$, that is, a state of point 2a. Point 2 indicates a state of the cold airflow flowing out of the vortex flow pipe, and a temperature at point 2 is $T_c$. Point 3 indicates a state of the separated hot airflow, and a temperature at point 3 is $T_h$. A process from point 1 to point 2 and a process from point 1 to point 3 are separation processes of cold and hot airflow. A process from point 3 to point 3' is a throttling process of the hot airflow through the throttling member 103, and an enthalpy value is unchanged before and after the throttling.

During the whole working process, it is impossible for the airflow to be isentropically expanded in the jet pipe 102. Due to a certain loss in kinetic energy exchange between airflow in the inner and outer layer regions in the vortex flow chamber 101a, and a heat transfer process toward a center in the vortex flow chamber 101a, the airflow is deviated from the adiabatic expansion process in the process from point 1 to point 2, causing the temperature $T_c$ of the cold airflow separated from the vortex flow separation pipe 101 to always exceed the temperature $T_s$ of the cold airflow under the adiabatic expansion condition.

The cooling effect and heating effect of the vortex flow separator 10 in the above embodiment are described hereinafter.

During operation, the gas with a temperature $T_1$ is separated into cold airflow with the temperature $T_c$ and hot airflow with the temperature $T_h$ by the vortex flow separation pipe 101. Therefore, $\Delta T_c = T_1 - T_c$ is called the cooling effect of the vortex flow separation pipe 101, $\Delta T_h = T_h - T_1$ is called the heating effect of the vortex flow separation pipe. $\Delta T_s = T_1 - T_s$ is defined as an isentropic expansion effect, to mark a theoretical cooling effect of the vortex flow separation pipe 101. Therefore, cooling effectiveness of the vortex flow separation pipe 101 is expressed by a cooling efficiency $\eta_o$, that is:

$$\eta_c = \frac{\Delta T_c}{\Delta T_s} = \frac{T_1 - T_c}{T_1 \left[1 - \left(\frac{p_2}{p_1}\right)^{\frac{k-1}{k}}\right]}$$

where $P_1$ is an airflow pressure at the inlet of the vortex flow separator 10; $P_2$ is an airflow pressure after the airflow expands in the jet pipe 103 and then enters into the vortex flow chamber 101a; and k is an adiabatic index of the gas (for example, the air).

In addition, there are balances of flow and heat during the operation of the vortex flow separator 10 which are described as follows.

If flow rates of the high-speed airflow entering the vortex flow separation pipe 101, the cold airflow at the cold end 101d, and the hot airflow at the hot end 101e are indicated by $q_{m1}$, $q_{mc}$ and $q_{mh}$, respectively, then $q_{m1} = q_{mc} + q_{mh}$.

If specific enthalpy of the above airflow are indicated by $h_1$, $h_c$ and $h_h$ (KJ/Kg), respectively, and the kinetic energy when the airflow flows out is neglected, then $q_{m1}h_1 = q_{mc}h_c + q_{mh}h_h$.

A cold airflow ratio is $$\mu_c = \frac{q_{mc}}{q_{m1}} = \frac{q_{mc}}{q_{mc} + q_{mh}}.$$

A corresponding relationship between enthalpy and temperature of the gas is $h = C_p T$.

The following formulas are obtained:

$$T_1 = \mu_c T_c + (1 - \mu_c) T_h T$$

$$\mu = \frac{T_h - T_1}{T_h - T_c} = \frac{\Delta T_h}{\Delta T_h + \Delta T_c}.$$

A cooling capacity of the vortex flow separation pipe 101 may also be obtained as follows:

the cooling capacity $Q_0$(kW) of the vortex flow separation pipe 101 is:

$$Q_0 = q_{mc} c_p (T_1 - T_c) = \mu_c q_{m1} c_p \Delta T_c;$$

then, a cooling capacity per kilogram of the cold airflow is:

$$q_o = \frac{Q_0}{q_{mc}} = c_p \Delta T_c;$$

and for each kilogram of high pressure gas, its unit cooling capacity $q_0$ may be expressed as:

$$q_0 = \frac{Q_0}{q_{m1}} = \mu_c c_p \Delta T_c = \mu_c q_0.$$

A heating capacity $Q_h$(kW) of the vortex flow separation pipe 101 is:

$$Q_h = q_{mh} c_p (T_h - T_1) = (1 - \mu_c) q_{m1} c_p \Delta T_h;$$

the heating capacity per kilogram of the hot airflow is:

$$q_h = \frac{Q_h}{q_{mh}} = c_p \Delta T_h;$$

and for each kilogram of the high pressure gas, its unit heating capacity may be expressed as:

$$q_h = \frac{Q_h}{q_{m1}} = (1 - \mu_c) c_p \Delta T_h.$$

The cooling effect $\Delta T_c = T_1 - T_c$ and the unit cooling capacity $q_0$ of the vortex flow separation pipe 101 described above are related to following factors, that is, a cold airflow component $\mu_c$, the working pressure $p_1$ at the inlet of the jet pipe 102, and a water vapor content in the airflow.

As for the cold airflow component $\mu_c$, when a value of the cold airflow component changes, $\Delta T_c$ and $q_0$ change correspondingly, and there are maximum values of $\Delta T_c$ and $q_0$ in a range of $\mu_c$ from 0 to 1. In a case that $\mu_c$ ranges from 0.3 to 0.35, $\Delta T_c$ reaches the maximum value; in a case that $\mu_c$ ranges from 0.6 to 0.7, $q_0$ reaches the maximum value. Moreover, the heating effect also changes with the change of $\mu_c$, $\Delta T_h$ continuously increases with the increase of $\mu_c$ without limitation.

As for the working pressure $p_1$ at the inlet of the jet pipe 102, when $p_1$ increases, both $\Delta T_c$ and $q_o$ increase. However, during increasing, the maximum value of $\Delta T_c$ moves in a direction in which $\mu_c$ decreases, and the maximum value of $q_0$ moves in a direction in which $\mu_c$ increases.

In a case that the gas is moist, water vapor in the cold airflow is condensed and heat is released, so a cooling temperature rises and the cooling efficiency decreases; a temperature rise of the hot airflow is reduced, and the heating effect is weakened.

The principle of the vortex flow separator 10 is described in detail above, the hot airflow and the cold airflow can be separated by the vortex flow separator 10, and the cold airflow can be input to the cooling passage 205 of the iron core 204 (as shown in FIG. 8), to function to cool the iron core 204. The structure is simple and energy-saving, and it is easy to form required cooling airflow for cooling of the iron core 204, to meet the cooling demand of the iron core 204.

According to the technical solution in the background, the hot airflow formed after cooling and heat exchange in the iron core is required to perform heat exchange in the surface type heat exchanger 300' in the nacelle to form cooling airflow again, and re-enters the iron core through the cooling airflow inlet orifice plate 500a' for heat exchange. In this way, the internal circulation airflow is cooled in the surface type heat exchanger 300' and directly discharged inside the nacelle 100', which is equivalent to be diffused inside the tail portion of the nacelle 100' at 360 degrees. While in the nacelle 100'A, a local resistance coefficient is close to 1, a flow area is infinitely large by sudden expansion, the essence is performing a submerged jet in an infinite space, and a result of the submerged jet is that original airflow inside the tail portion of the nacelle is agitated. After the agitation, kinetic energy of the jet airflow is attenuated, and the mixing of the airflow causes the jet airflow to be disordered, which is a sign of low-grade energy. This is a typical phenomenon that high-grade mechanical energy is converted to low-grade heat energy, which is also a natural waste of energy. That is, the energy that the induced draft fan gives to the airflow is not applied to a driving force of the transmission or conveying after the airflow flows out of the outlet, which means, the diffusion after the outlet is equal to useless work performance of the induced draft fan. Therefore, in this way, almost 99% of the kinetic energy of the internal circulation airflow after heat exchange is diffused in the space, and almost all of the kinetic energy of the flow is lost, therefore, more energy is required for recirculation of the airflow, which means, a large-sized surface type heat exchanger is required to be arranged, and an induced draft fan is also required to be provided, but the cooling effect is not satisfactory.

In the present embodiment, a device for forming the cooling airflow, that is, the vortex flow separator 10 described above, can be arranged in a narrow space, it is not necessary to provide the large-sized surface type heat exchanger, and the structure and cooling effect of the iron core 204 in the conventional technology are improved, which saves energy consumption of the entire wind turbine. Of course, the cooling method in the background technology may also be employed together with the medium conveying and heat exchange device in this embodiment.

In fact, in the structure of the iron core 204 in the above embodiment, the vortex flow separator 10 (that is, the "tangentially input inner spiral vortex flow pipe") is used to improve the structure of the iron core of the generator, and the stator of the generator and the iron core 204 thereof become a channel for the generating, conveying, and heat exchange of the cooling medium. In this way, the insulation of the generator is indirectly protected, and the structure of the cooling passage of the iron core is improved, which is a technique of generating a cold source inside the iron core 204 to reinforce the heat exchange of the heat source of the iron core (in the following embodiments, a cold source and a dry source are also formed in an annular cavity of the winding nose 203a). The present application relates to the field of cooling technology of wind turbines, and in particular to an airflow generating, conveying and heat exchange device functioning to cool and dry insulation systems of a magnetic pole and an armature of a permanent magnet wind turbine. In the novel electromagnetic device, the iron core 204 is capable of self-drying, which ensures that the insulating material can be dried, and the iron core 204 further has a self-cooling component to generate the cooling medium to suppress the temperature rise of the iron core 204, and can cool, dehumidify and dry the internal environment of the generator by means of the generated cooling airflow, besides, the hot airflow can also dry the stator core and its insulating varnish, or dry an insulating layer and insulating varnish of the stator winding and an exposed portion at an end of the stator winding, to achieve an ultimate goal of protecting the insulating material (insulating varnish and solid insulating material around a conductor) and maintaining the level of electrical insulation. That is to say, unlike the conventional iron core structure, the iron core structure according to the embodiment has the function of drying and cooling itself, which is a novel iron core structure.

With continued reference to FIG. 9, the medium conveying and heat exchange device includes an air collection tank 40 in which the airflow is converged, and the air compressor 70 supplies the compressed gas to the air collection tank 40. The air collection tank 40 is provided with multiple branch pipes 401, each of the multiple branch pipes 401 is provided with the vortex flow separator 10 for supplying the airflow to the jet pipe 102 of the vortex flow separator 10. Thus, one air compressor 70 can supply the compressed gas to multiple vortex flow separators 10, which simplifies the structure. In addition, by providing the multiple vortex flow separators 10, the cooling airflow may be supplied to the multiple cooling passages 205, and thereby improving the cooling effect.

In FIG. 8, only the vortex flow separators 10 at one axial section are shown. It can be seen that, in a case that the iron core 204 is provided with multiple cooling passages 205 distributed both axially and circumferentially, multiple rows of the vortex flow separators 10 may also be arranged in a circumferential direction of the iron core 204 (FIG. 8 shows a row of the vortex flow separators 10 arranged axially).

Each of the branch pipes 401 may be provided with two vortex flow separators 10, and the branch pipes 401 supplies the airflow to the jet pipes 102 of the two vortex flow separators 10 at the same time, and the two vortex flow separators 10 supply the cooling airflow to two adjacent cooling passages 205. As shown in FIG. 9, the air collection tank 40 is provided with a row of branch pipes 401 distributed axially, and each of the branch pipes 401 is in communication with two axially adjacent vortex flow separators 10, the jet pipes 102 of the two vortex flow separators 10 are integrally formed with the branch pipe 401, and of course, the jet pipes 102 of the two vortex flow separators 10 and the branch pipe 401 may also be separately formed and then connected by connectors. In this way, the air collection tank 40 may be provided with multiple rows of branch pipes 401 distributed circumferentially, so as to form supply points of the cold airflow in the circumferential direction and the axial direction of the iron core 204. Of course, one branch pipe 401 may also supply the airflow to the two circumferentially adjacent vortex flow separators 10. In addition, one branch pipe 401 may also supply compressed airflow to more than two vortex flow separators 10, which is not limited.

The cold end pipe section 101c of the vortex flow separator pipe 101 of the vortex flow separator 10 can be inserted into the cooling passage 205 of the iron core 204, for example, by a method of shrink fit. The cold end pipe section 101c is cooled and then inserted into the cooling passage 205 to be tightly pressed by expansion, or the cold end 101d of the cold end pipe section 101c may be welded to the cooling passage 205, or a connector is welded to the cooling passage 205 or connected to the cooling passage 205 by shrink fit, and the cold end 101d of the vortex flow separator pipe 101 is connected to and in communication with the connector, as long as the cold airflow at the cold end 101d can be conveyed into the cooling passage 205, for example, the cold airflow may be conveyed to a confluence tank or a confluence main pipe and then distributed into the cooling passage 205, and the specific way is not limited in this solution.

The cooling airflow passes through the cooling passage 205 for heat exchange to form the hot airflow. As shown in FIG. 9, the hot airflow, formed by the cooling airflow which has passed through the cooling passage 205, first enters the annular air gap a between the iron core 204 and the magnetic pole 202, to perform a drying function. The hot airflow flowing out of the annular air gap a can be led out of the generator through a pipe port inside the generator, for example, the airflow may enter a hub of the wind turbine through a pneumatic slip ring, and then get to a front edge inside the blade and/or a position of a pitch bearing of the wind turbine, and may also enter a wind gauge support and/or a yaw bearing at an upper portion of the nacelle, to function to dry multiple positions.

In FIG. 8, the cold airflow of the vortex flow separator 10 is radially conveyed toward the cooling passage 205 of the iron core 204 from inside to outside, that is, in the radial direction of the iron core 204, the cold airflow is conveyed from a root portion of the iron core 204 where the iron core 204 is fixed in the radial direction to the cooling passage 205, and the cold airflow leaves the iron core 204 and enters the annular air gap a. It could be understood that, the cold airflow may also be conveyed radially from outside to inside, that is, the cold airflow is conveyed from the annular air gap a into the cooling passage 205 of the iron core 204, to reach, along the radial direction, the root portion of the iron core 204 where the iron core 204 is fixed in the radial direction and a side of the iron core bracket. In FIG. 8, the cold airflow is conveyed from inside to outside, in this case, the vortex flow separators 10 may be arranged in a central through hole of the iron core 204, that is, in the iron core bracket, which facilitates the arrangement of the structure.

Figure 15:
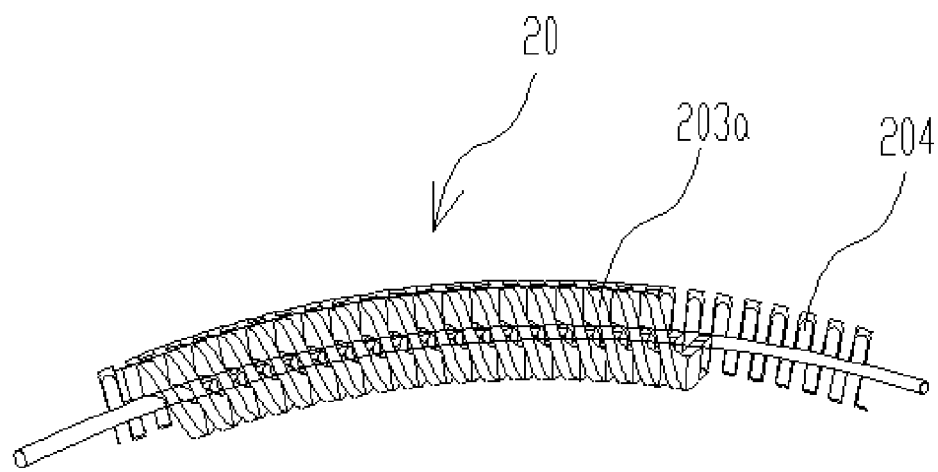
FIG. 15 is a schematic view showing that an annular spray pipe in FIG. 8 passes through winding noses of a part of windings.
Figure 16:
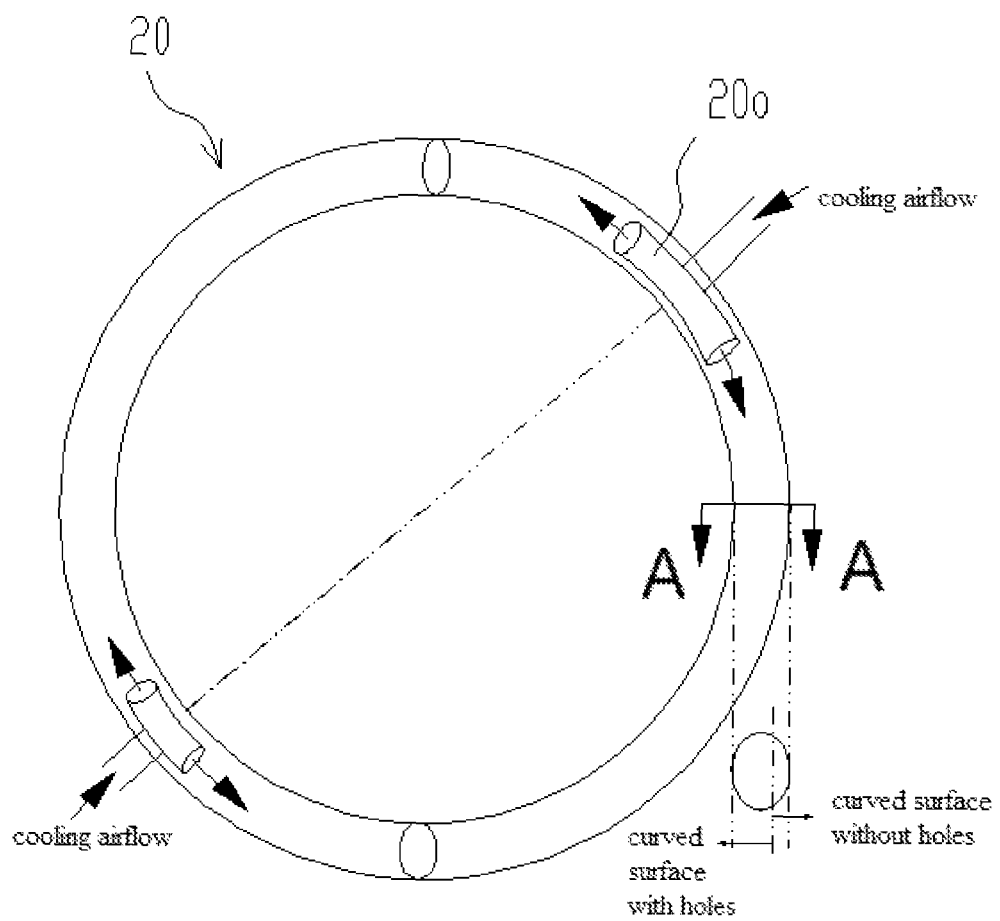
FIG. 16 is a schematic view showing the annular spray pipe.

With continued reference FIG. 8 in conjunction with FIGS. 15 and 16, FIG. 15 is a schematic view showing that an annular spray pipe 20 in FIG. 8 passes through winding noses 203a of a part of the windings; and FIG. 16 is a schematic view showing the annular spray pipe 20, also showing the structure of a flow passage of the annular spray pipe 20.

As can be seen from FIG. 8, the windings 203 of the iron core 204 form end portions at two ends in the axial direction of the iron core 204, that is, the winding noses 203a shown in the figure. Multiple winding noses 203a are circumferentially distributed along the ends of the iron core 204. FIG. 15 shows a portion of a circumference of the iron core 204, where the annular spray pipe 20 shown in FIG. 16 passes through the winding noses 203a which form a penetration hole.

The annular spray pipe 20 is provided with multiple spray holes along its circumferential direction, and the hot airflow output by the above vortex flow separator 10 can be conveyed to the annular spray pipe 20, such that the hot airflow can flow out from the spray holes and is sprayed toward the winding noses 203a to perform the drying function. The drying function is not only for drying the winding noses 203a, but more importantly, a dry environment is created at the ends of the windings 203. As shown in FIG. 8, after each of the windings 203 is placed in a slot of the iron core 204, a slot wedge 206 is axially inserted, to prevent the winding 203 from being separated from the slot radially. After an impregnation process for insulation, the insulating varnish is provided among the slot wedge 206, the slot and the winding 203, to create a dry environment at the ends of the winding 203, which is beneficial to provide a dry environment for the insulating varnish at the ends of the winding 203, and thus improving the insulation performance. That is, the hot airflow is used for drying a junction of the root portions of the ends of the winding 203 and the iron core 204.

Of course, it is also feasible to convey the cold airflow generated by the vortex flow separator 10 into the annular spray pipe 20, to cool the windings 203 at the end portions, which is beneficial to heat dissipation of the windings 203 and the iron core 204. As shown in FIG. 8, in the axial direction, the cold end pipe sections 101c of the vortex flow separators 10 at two ends of the row of the vortex flow separators 10 are connected to the annular spray pipe 20 through connecting pipes 30.

With continued reference to FIG. 16, a cross-sectional view of the annular spray pipe taken in a direction A-A is shown at a lower right portion in FIG. 16. It can be seen that, an outer side of the annular spray pipe 20 is a curved surface without holes, that is, no spray hole is provided, and the spray holes are located at an inner side and a middle portion of the annular spray pipe 20. After entering the annular spray pipe 20, the cold airflow or the hot airflow flows in the annular spray pipe 20 in an arc-shaped path, and a centrifugal force is generated. The spray holes are arranged at the inner side and in the middle portion of the annular spray pipe 20, to prevent the airflow from directly rushing out from the outer side under an action of the centrifugal force, which is beneficial to uniform spray of the airflow in the circumferential direction.

Further, an airflow dividing pipe 20a may be arranged inside the annular spray pipe 20, and after entering the airflow dividing pipe 20a, the cold airflow or the hot airflow are sprayed from two ends of the airflow dividing pipe 20a. As shown in FIG. 16, the annular spray pipe 20 is specifically circular-shaped, and the airflow dividing pipe 20a is an arc-shaped section matching with an inner cavity of the annular spray pipe 20. In this way, after entering the airflow dividing pipe 20a, the cold airflow or hot airflow are sprayed from the two ends of the airflow dividing pipe 20a, which is beneficial to uniform spray of the cold airflow or the hot airflow being sprayed from the annular spray pipe 20. Preferably, two or more airflow dividing pipes 20a may be provided. In FIG. 16, two airflow dividing pipes 20a are symmetrically distributed along a center line of the annular spray pipe 20, which is also beneficial to uniform spray of the airflow.

The hot airflow separated by the vortex flow separator 10 can be converged in a hot airflow confluence tank 50. In addition to being conveyed to the annular spray pipe 20, the hot airflow may also be used to dry two sides of other air gaps (such as the protective coating of the permanent magnetic pole at the rotor side and the insulating varnish on a stator surface) inside the generator when the wind turbine is stopped. In a case that the drying is performed when the wind turbine is stopped, a thermal load of the generator will not be increased due to the hot airflow.

In addition, similar to the hot airflow formed by the heat exchange in the cooling passage 205 of the iron core 204, the hot airflow in the hot airflow confluence tank 50 may also be used for drying or heating devices and equipment other than the generator, to prevent freezing. That is, the hot airflow separated by the vortex flow separator 10 may also be led out of the generator through the pipe port inside the generator. For example, the hot airflow may enter the hub of the wind turbine through the pneumatic slip ring, and then get to get to the front edge inside the blade (specifically, a radial passage of the blade near the front edge of the blade) and/or the position of the pitch bearing of the wind turbine, or enter into a peripheral portion of connecting bolts and the clamp nuts at the root portion of the blade, to perform drying. The hot airflow may also enter the wind gauge support on the upper portion of the nacelle, to heat a deflection mechanism thereof, so as to prevent freezing, frosting, and/or enter the yaw bearing to perform heating, so as to prevent grease of the yaw bearing from freezing. That is to say, functions of components at multiple positions are ensured, so that the components can continue to adapt to the natural environment, and in a case that a temperature or humidity of the natural environment changes greatly, the components still can perform their original functions.

Figure 17:
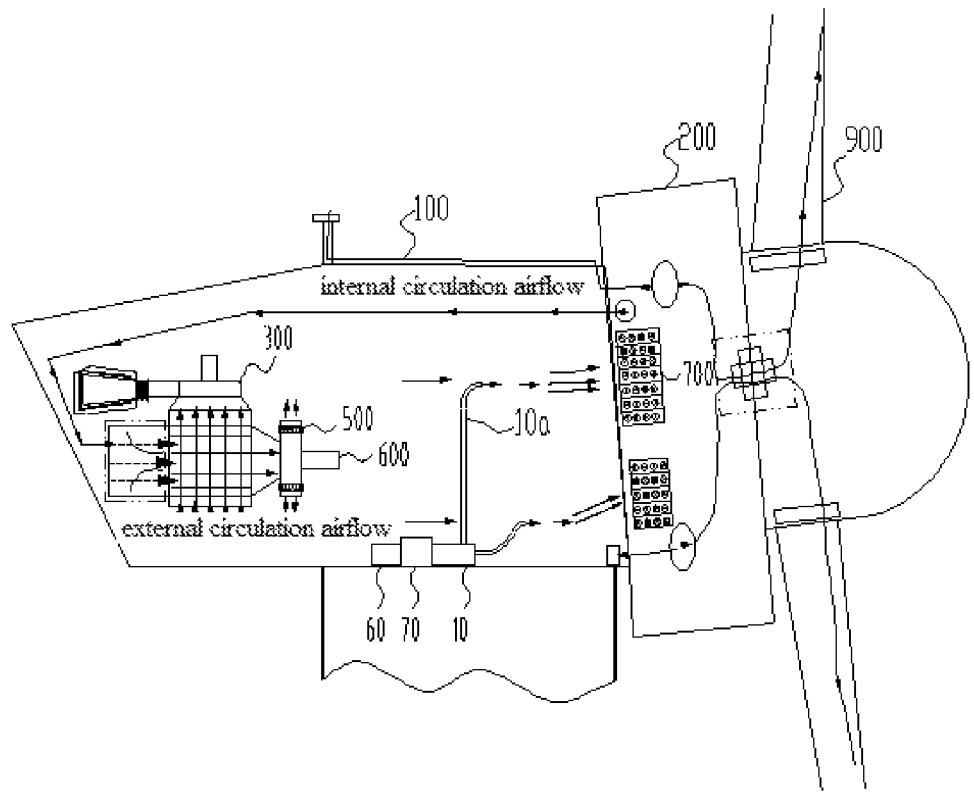
FIG. 17 is a schematic view showing that the vortex flow separator is installed inside a nacelle.

The vortex flow separator 10 serves as a part of the structure of the iron core, and is used as the cold source of the iron core 204 itself, in addition, the vortex flow separator 10 may also be used for other parts of the wind turbine. As shown in FIG. 17, FIG. 17 is a schematic view showing that the vortex flow separator 10 is arranged inside a nacelle 100.

In FIG. 17, a surface type heat exchanger 300 is arranged inside the nacelle 100 of a wind turbine. Airflow having a relatively high temperature, which has adsorbed heat from heat exchange with a surface of a heat source, flows out of a generator 200 is internal circulation airflow of a heat exchange system. Under a suction effect of an induced draft fan 500 (driven by a driving motor 600), the internal circulation airflow enters the surface type heat exchanger 300; after exchanging heat (which is an exothermic process) with external circulation airflow having a relatively low temperature, the internal circulation airflow is cooled to become cooling airflow having a relatively low temperature, and the above cooling airflow may be sucked again to enter the generator 200 to participate in cooling and heating exchange of the heat source.

In this embodiment, the vortex flow separator 10 is further arranged inside the nacelle 100. Similar to the above embodiment, the compressed airflow can be conveyed from the air compressor 70 to the vortex flow separator 10, and the air filter 60 is provided upstream of the air compressor 70 for filtration. Cold airflow and hot airflow can be generated by the vortex flow separator 10, and the cold airflow and the hot airflow may be conveyed to the generator 200, specifically through a long airflow pipe 10a.

Figure 18:
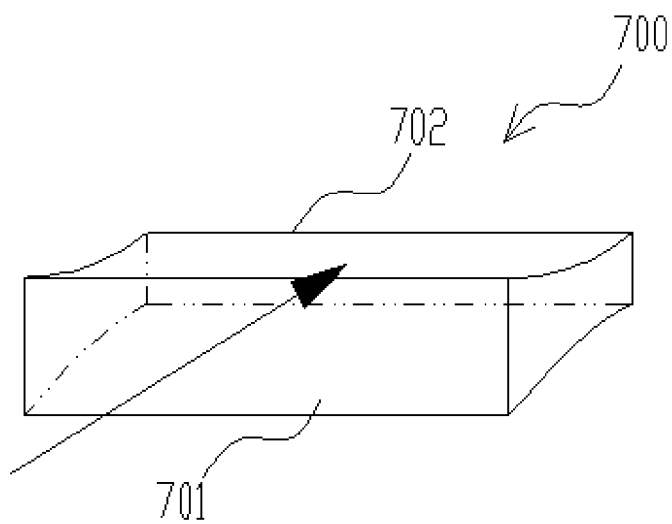
FIG. 18 is a schematic view showing a variable cross-section conveying pipe having a gradually decreased cross-sectional flow area.

When the cold airflow enters, the cold airflow may enter through the cooling airflow orifice plate just like the background technology, or as shown in FIG. 17, a variable cross-section conveying pipe 700 may be provided, And a cross-sectional flow area of the variable cross-section conveying pipe 700 is gradually increased, or gradually decreased, or first gradually decreased and then gradually increased to form a convergent-divergent flow passage in a conveying direction. FIG. 18 is a schematic view showing a variable cross-section conveying pipe 700 having a converging cross-sectional flow area.

With the arrangement of the gradually decreased cross-sectional flow area, high speed airflow is obtained after the airflow flows from an inlet end 701 and out of an outlet end 702 of the variable cross-section conveying pipe 700, and heat energy contained in the airflow is reduced, which is a cooling process of the airflow, that is, the airflow conveyed out of the variable cross-section conveying pipe 700 is further cooled, so that the cooling airflow having a lower temperature can be conveyed to the iron core 204, and thus improving the heat exchange effect.

The arrangement of the gradually increased cross-sectional flow area is more suitable for situations that the structure inside a shell of the generator 200 is relatively complicated. For example, in a case that the outlet end 702 of the variable cross-section conveying pipe 700 may be blocked by other members, and is difficult to exactly face the iron core 204, the variable cross-section conveying pipe 700 may be arranged in such a manner that the cross-sectional flow area is gradually increased, to allow a heat exchange medium flowing out of the variable cross-section conveying pipe 700 to have a relatively high pressure, so that the heat exchange medium can provide a driving force for overcoming local resistance of each part of the above inlet flow passage, to bypass obstacles and reach the iron core 204, and still has a relatively high flow rate to perform heat exchange, and a heat transfer rate can be supported by the relatively high flow rate.

In a case that a speed of the airflow entering the variable cross-section conveying pipe 700 is a subsonic speed, and Ma<1 (Ma is the Mach number), and the airflow is required to be cooled and accelerated at the same time with the help of the variable cross-section conveying pipe 700 (in order to directly obtain a heat exchange condition in which the heat exchange rate is immediately increased), according to the formula $$\frac{df}{f} = (M^2 - 1)\frac{dc}{c},$$

(where, f is the cross-sectional flow area of the flow passage; M is the Mach number; c is an average flow rate in a normal direction of the cross-sectional flow area of the flow passage), that is, dc>0, a right side of the equation is negative, therefore, df<0 should be ensured to meet the requirement of the equation. It is indicated that, the cross-sectional flow area of the variable cross-section conveying pipe 700 should be gradually decreased in a flowing direction of the airflow. When the cross-sectional flow area of the variable cross-section conveying pipe 700 is decreased to allow the speed of the airflow to reach the local sound speed, in order to obtain supersonic airflow, the flow passage is required to be gradually increased, that is, the convergent-divergent flow passage is employed.

It should be noted that, in the above embodiments, the vortex flow separator 10 is used to convey the cooling airflow to the iron core 204. In fact, the cold airflow or the hot airflow separated by the vortex flow separator 10 may also be conveyed to other parts of the wind turbine, such as a motor bearing, a yaw bearing, a pitch bearing and other shafting systems, or a blade, or the like. Moreover, it is applicable not only to the generator 200 itself, but also to other electrical equipment in the wind turbine that is required to be cooled, such as a converter cabinet, a pitch servo control cabinet, and a pitch servo motor, and the like. It should be noted that, the vortex flow separator 10 can provide cold airflow and hot airflow for the iron core 204 of the generator. The hot airflow can be used for drying and insulation. It can be understood that, the hot airflow can also be provided for other electromagnetic devices, such as an electromagnet, a transformer, an electric reactor, a motor, and the like.

Only preferred embodiments of the present application are described above. It should be noted that, for those skilled in the art, a few of modifications and improvements may be made to the present application without departing from the principle of the present application, and these modifications and improvements are also deemed to fall into the scope of the present application defined by the claims.

The invention claimed is:

1. A medium conveying and heat exchange device for an iron core in an electromagnetic device, the iron core being provided with a cooling passage running through the iron core radially, wherein the medium conveying and heat exchange device comprises a plurality of vortex flow separators configured to provide a heat exchange medium in the electromagnetic device; and wherein each of the vortex flow separators comprises a jet pipe and a vortex flow separation pipe, wherein the vortex flow separation pipe comprises a vortex flow chamber, and a cold end pipe section and a hot end pipe section located at two ends of the vortex flow chamber, respectively; the jet pipe is in communication with the vortex flow chamber, and compressed airflow flows through the jet pipe to form spiral airflow, and the spiral airflow flows into the vortex flow chamber in a tangential direction of the vortex flow chamber;

a cross-sectional area of the cold end pipe section is smaller than a cross-sectional area of the vortex flow chamber, and a cross-sectional area of the hot end pipe section is equal to or greater than the cross-sectional area of the vortex flow chamber; and a cone-shaped throttling member is arranged inside the hot end pipe section, the throttling member has a cone-shaped surface facing the cold end pipe section, and an annular gap formed between the throttling member and an inner wall of the hot end pipe section is embodied as a valve port; after the spiral airflow is introduced into the vortex flow separation pipe, external airflow of the spiral airflow is allowed to flow toward the valve port, be gradually heated to become hot airflow, and then flow out through the valve port; central airflow of the spiral airflow is allowed to pass by the cone-shaped surface of the throttling member and flow back, be cooled to become cold airflow, and then flow out from the cold end pipe section; the cold airflow and/or the hot airflow are heat exchange mediums provided by the electromagnetic device, and the cold airflow provided by the plurality of vortex flow separators is conveyed into the cooling passage as cooling airflow; and the medium conveying and heat exchange device further comprises an air collection tank in which the compressed airflow is converged, the air collection tank is provided with a plurality of branch pipes, each of the branch pipes is provided with at least two of the plurality of the vortex flow separators, and each of the branch pipes is configured to supply the compressed airflow to jet pipes of the corresponding two vortex flow separators.

2. The medium conveying and heat exchange device according to claim 1, wherein one end of the vortex flow chamber is provided with a through hole, and a pipe body of the cold end pipe section is in communication with the through hole; the vortex flow chamber and the hot end pipe section are integrally formed and have equal diameters.

3. The medium conveying and heat exchange device according to claim 1, wherein the throttling member is located at a central portion of the hot end pipe section.

4. The medium conveying and heat exchange device according to claim 3, wherein an axis of the cold end pipe section is configured to coincide with an axis of the throttling member.

5. The medium conveying and heat exchange device according to claim 3, wherein the valve port is adjustable in size.

6. The medium conveying and heat exchange device according to claim 1, wherein the throttling member is arranged at an end of the hot end pipe section.

7. The medium conveying and heat exchange device according to claim 1, wherein the medium conveying and heat exchange device comprises an air compressor, the air compressor is configured to supply compressed airflow to the air collection tank, and an air filter is arranged upstream of the air compressor.

8. The medium conveying and heat exchange device according to claim 1, wherein the branch pipe and the jet pipes in communication with the branch pipe are integrally arranged.

9. The medium conveying and heat exchange device according to claim 1, wherein the cold end pipe section of each of the vortex flow separators is inserted into the cooling passage to allow the cold end pipe section to be in communication with the cooling passage.

10. The medium conveying and heat exchange device according to claim 1, wherein the medium conveying and heat exchange device further comprises a hot airflow confluence tank, and the hot airflow flowing out of each of the vortex flow separators is converged in the hot airflow confluence tank.

11. The medium conveying and heat exchange device according to claim 1, wherein windings are accommodated in slots of the iron core, the medium conveying and heat exchange device further comprises an annular spray pipe, the annular spray pipe is inserted into a penetration hole formed by winding nose portions of the windings, wherein the winding nose portions are end portions of the windings located at an axial end of the iron core; and the annular spray pipe is provided with a plurality of spray holes along its circumferential direction.

12. The medium conveying and heat exchange device according to claim 1, wherein the hot airflow formed by the cold airflow through heat exchange in the cooling passage of the iron core, and/or the hot airflow separated from each of the vortex flow separators, is allowed to be conveyed to at least one of the following components of a wind turbine:
a hub;
a front edge inside a blade;
a pitch bearing;
a wind gauge support on an upper portion of a nacelle; and
a yaw bearing.

13. The medium conveying and heat exchange device according to claim 11, wherein the cold airflow or the hot airflow output from each of the vortex flow separators is allowed to be conveyed to the annular spray pipe.

14. The medium conveying and heat exchange device according to claim 11, wherein the spray holes are arranged at an inner side of the annular spray pipe, or the spray holes are arranged at an inner side and a middle portion of the annular spray pipe, and an outer side of the annular spray pipe is not provided with the spray holes.

15. The medium conveying and heat exchange device according to claim 11, wherein at least one airflow dividing pipe is arranged inside the annular spray pipe, the cold airflow or the hot airflow is allowed to first enter the airflow dividing pipe, and the airflow dividing pipe is configured to spray the cold airflow or the hot airflow from two ends of the airflow dividing pipe, to guide the hot airflow or the cold airflow to flow in the circumferential direction of the annular spray pipe.

* * * * *